US012612515B2

(12) United States Patent (10) Patent No.: US 12,612,515 B2
Nakayama et al. (45) Date of Patent: *Apr. 28, 2026

(54) POWER STORAGE DEVICE BINDER COMPOSITION, POWER STORAGE DEVICE ELECTRODE SLURRY, POWER STORAGE DEVICE ELECTRODE, AND POWER STORAGE DEVICE

(71) Applicant: ENEOS Materials Corporation, Minato-ku (JP)

(72) Inventors: Takuya Nakayama, Minato-ku (JP); Kana Masuda, Minato-ku (JP); Sadatoshi Heiguchi, Minato-ku (JP); Yingcheng Lin, Minato-ku (JP)

(73) Assignee: ENEOS Materials Corporation, Minato-ku (JP)

( * ) Notice: Subject to any disclaimer, the term of this patent is extended or adjusted under 35 U.S.C. 154(b) by 531 days.

This patent is subject to a terminal disclaimer.

(21) Appl. No.: 18/042,119

(22) PCT Filed: Jul. 30, 2021

(86) PCT No.: PCT/JP2021/028324
§ 371 (c)(1),
(2) Date: Feb. 17, 2023

(87) PCT Pub. No.: WO2022/039002
PCT Pub. Date: Feb. 24, 2022

(65) Prior Publication Data
US 2023/0312906 A1 Oct. 5, 2023

(30) Foreign Application Priority Data

Aug. 20, 2020 (JP) ................................. 2020-139130

(51) Int. Cl.
| *C08L 25/04* | (2006.01) |
| *C08L 55/02* | (2006.01) |
| *H01M 4/04* | (2006.01) |
| *H01M 4/38* | (2006.01) |
| *H01M 4/62* | (2006.01) |

(52) U.S. Cl.
CPC .............. *C08L 55/02* (2013.01); *C08L 25/04* (2013.01); *H01M 4/0404* (2013.01); *H01M 4/386* (2013.01); *H01M 4/622* (2013.01); *C08L 2203/20* (2013.01)

(58) Field of Classification Search
CPC ...... C08L 55/02; C08L 25/04; C08L 2203/20; C08L 51/06; H01M 4/0404; H01M 4/386; H01M 4/622; H01M 4/1395; H01M 4/134; Y02E 60/10; H01G 11/06; H01G 11/38; C08F 279/02
See application file for complete search history.

(56) References Cited

U.S. PATENT DOCUMENTS

| 4,374,702 A | 2/1983 | Turbak et al. |
| 4,483,743 A | 11/1984 | Turbak et al. |
| 8,513,349 B2 | 8/2013 | Ootsuka et al. |
| 8,663,839 B2 | 3/2014 | Maegawa et al. |
| 8,709,652 B2 | 4/2014 | Maegawa et al. |
| 9,171,675 B2 | 10/2015 | Kojima et al. |
| 9,520,242 B2 | 12/2016 | Kitaguchi et al. |
| 9,522,995 B2 | 12/2016 | Otsuka et al. |
| 9,583,278 B2 | 2/2017 | Miyauchi et al. |
| 9,758,629 B2 | 9/2017 | Katsuda et al. |
| 9,966,606 B2 | 5/2018 | Otsuka et al. |
| 10,403,896 B2 | 9/2019 | Nakayama et al. |
| 10,505,195 B2 | 12/2019 | Ugawa et al. |
| 2015/0132644 A1 | 5/2015 | Sonobe et al. |
| 2015/0187516 A1 | 7/2015 | Miyauchi et al. |
| 2017/0279123 A1 | 9/2017 | Nakayama et al. |
| 2018/0258327 A1 | 9/2018 | Tanaka et al. |
| 2022/0278330 A1 | 9/2022 | Nakayama et al. |
| 2022/0302455 A1 | 9/2022 | Nakayama et al. |

(Continued)

FOREIGN PATENT DOCUMENTS

| CN | 104335401 A | 2/2015 |
| EP | 4 144 772 A1 | 3/2023 |
| EP | 4 203 108 A1 | 6/2023 |

(Continued)

OTHER PUBLICATIONS

Extended European Search Report issued Jul. 30, 2024 in European Application No. 21858150.2, 22 pgs.
U.S. Appl. No. 13/599,288, filed Aug. 30, 2012, US-2013-0052530-A1, Hironori Kitaguchi et al.
U.S. Appl. No. 13/977,255, filed Aug. 15, 2013, US-2013-0323588-A1, Ichiro Kajiwara et al.
U.S. Appl. No. 13/983,428, filed Oct. 9, 2013, US-2014-0217322-A1, Kinji Yamada et al.
U.S. Appl. No. 13/985,390, filed Oct. 18, 2013, US-2014-0038041-A1, Ichiro Kajiwara et al.
U.S. Appl. No. 14/893,875, filed Nov. 24, 2015, US-2016-0104893-A1, Kazuaki Itou et al.

(Continued)

*Primary Examiner* — Kumar R Bhushan
(74) *Attorney, Agent, or Firm* — Oblon, McClelland, Maier & Neustadt, L.L.P.

(57) ABSTRACT

A binder composition for an electrical storage device includes a polymer (A) and a liquid medium (B), where with respect to 100 mass % in total of repeating units contained in the polymer (A), the polymer (A) contains 15 mass % to 60 mass % of a repeating unit (a1) derived from a conjugated diene compound and 1 mass % to 10 mass % of a repeating unit (a2) derived from an unsaturated carboxylic acid. In the binder composition, the following characteristics are satisfied: tan δ (loss elastic modulus/storage elastic modulus) in dynamic viscoelasticity of the polymer (A) has one peak top in a range of from −40° C. to less than 50° C. (tan δ(Tp1)), and has one peak top in a range of from 50° C. to 150° C. (tan δ(Tp2)), and the following relationship is satisfied tan δ(Tp2)/tan δ(Tp1)≥0.5.

10 Claims, 1 Drawing Sheet

(56) References Cited

U.S. PATENT DOCUMENTS

| 2023/0275231 A1 | 8/2023 | Nakayama et al. |
| 2023/0312906 A1 | 10/2023 | Nakayama et al. |

FOREIGN PATENT DOCUMENTS

| JP | 60-19921 | B2 | | 5/1985 |
| JP | 2011-26760 | A | | 2/2011 |
| JP | 2011-171181 | A | | 9/2011 |
| JP | 2012-25833 | A | | 2/2012 |
| JP | 2012-36517 | A | | 2/2012 |
| JP | 2012-36518 | A | | 2/2012 |
| JP | 5477610 | B1 | | 4/2014 |
| JP | 2014-181421 | A | | 9/2014 |
| JP | 2016015270 | A | * | 1/2016 |
| JP | 5999399 | B2 | | 9/2016 |
| JP | 2017126456 | A | * | 7/2017 |
| JP | 2019-197695 | A | | 11/2019 |
| KR | 10-2017-0061660 | A | | 8/2017 |
| TW | 201544563 | A | | 12/2015 |
| TW | 201717454 | A | | 5/2017 |
| WO | WO-2013/183717 | A1 | | 12/2013 |
| WO | WO 2015/012366 | A1 | | 1/2015 |
| WO | WO-2017/038383 | A1 | | 3/2017 |
| WO | WO-2021/029411 | A1 | | 2/2021 |
| WO | WO-2021/039503 | A1 | | 3/2021 |
| WO | WO-2021/220707 | A1 | | 11/2021 |
| WO | WO-2022/039002 | A1 | | 2/2022 |

OTHER PUBLICATIONS

U.S. Appl. No. 15/755,392, filed Feb. 26, 2018, US-2018-0258327-A1, Naruki Tanaka et al.

U.S. Appl. No. 17/599,277, filed Sep. 28, 2021, US-2022-0190342-A1, Keigo Aso et al.
U.S. Appl. No. 17/638,754, filed Feb. 25, 2022, US-2022-0278330-A1, Takuya Nakayama et al.
U.S. Appl. No. 17/634,195, filed Feb. 9, 2022, US-2022-0302455-A1, Takuya Nakayama et al.
U.S. Appl. No. 17/906,456, filed Sep. 15, 2022, Takuya Nakayama et al.
U.S. Appl. No. 17/906,449, filed Sep. 15, 2022, Tatsuya Abe et al.
U.S. Appl. No. 17/997,344, filed Oct. 27, 2022, Takuya Nakayama et al.
International Search Report issued Oct. 12, 2021 in PCT/JP2021/028324 filed on Jul. 30, 2021, 2 pages.
International Search Report issued Jun. 21, 2022 in PCT/JP2022/017002 (with unedited computer-generated English translation), 5 pages.
Combined Taiwanese Office and Search Report issued Mar. 10, 2025 in Taiwanese Patent Application No. 111113997 (with unedited computer-generated English translation), 11 pages.
Extended European Search Report issued Jun. 10, 2025 European Patent Application No. 22788094.5, 14 pages.
Korean Office Action issued Sep. 24. 2025 in Korean Patent Application No. 10-2023-7008970 with computer-generated English translation, 17 pgs.
Combined Chinese Office Action and Search Report issued Dec. 13, 2025 in Chinese Patent Application No. 202180050876.5 (with unedited computer-generated English translation of Office Action only), 17 pages.
Korean Office Action issued Dec. 15, 2025 in Korean Patent Application No. 10-2023-7038659 (with unedited computer-generated English translation), 19 pages.

* cited by examiner

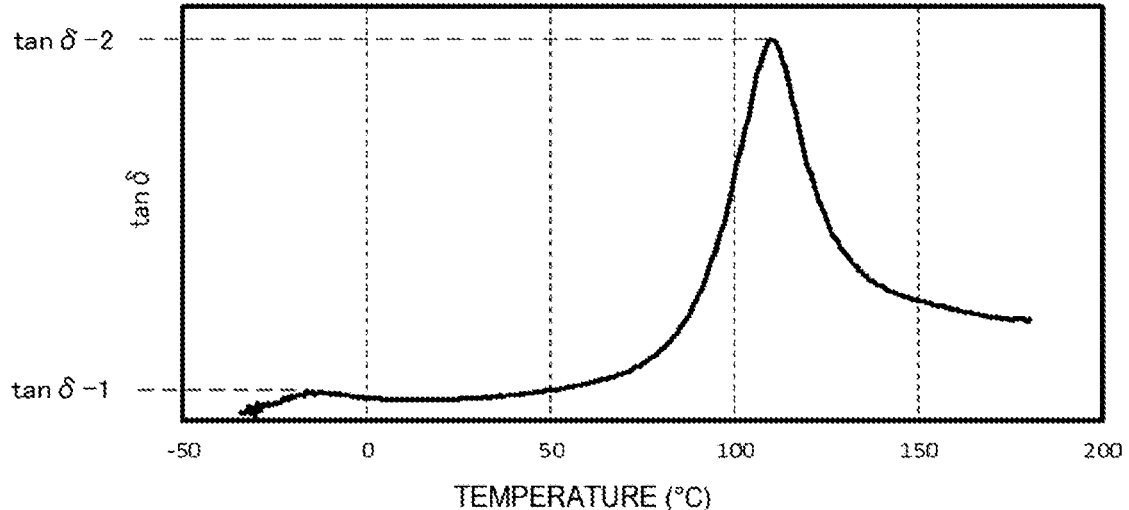

POWER STORAGE DEVICE BINDER COMPOSITION, POWER STORAGE DEVICE ELECTRODE SLURRY, POWER STORAGE DEVICE ELECTRODE, AND POWER STORAGE DEVICE

TECHNICAL FIELD

The present invention relates to a binder composition for an electrical storage device, a slurry for an electrical storage device electrode, which contains the binder composition and an active material, an electrical storage device electrode formed by applying the slurry onto a current collector and drying the resultant, and an electrical storage device including the electrical storage device electrode.

BACKGROUND ART

In recent years, an electrical storage device having a high voltage and a high energy density has been demanded as a power source for driving electronic equipment. A lithium ion battery, a lithium ion capacitor, or the like is promising as such electrical storage device.

An electrode to be used for such electrical storage device is produced by applying a composition (slurry for an electrical storage device electrode) containing an active material and a polymer that functions as a binder to a surface of a current collector and drying the resultant. Characteristics demanded of the polymer to be used as a binder may include: a binding ability between the active materials; an adhesive ability between the active material and the current collector; abrasion resistance in a process of winding the electrode; and powder fall-off resistance that prevents fine powder or the like of the active material from being detached from a coating film of the applied and dried composition (hereinafter sometimes referred to as "active material layer") even in subsequent cutting or the like. Such binder material expresses satisfactory adhesiveness and reduces internal resistance of a battery resulting from the binder material, thereby being able to impart a satisfactory charge-discharge characteristic to the electrical storage device.

With regard to the binding ability between the active materials, the adhesive ability between the active material and the current collector, and the powder fall-off resistance, it has been empirically revealed that their qualities of performance have a nearly proportional relationship with each other. Accordingly, those properties are hereinafter sometimes collectively referred to with the term "adhesiveness".

Further, in recent years, research and development of an electric car having mounted thereon an electrical storage device has been vigorously performed for the purpose of reducing an environmental load. When the electrical storage device is mounted as a driving power source for an electric car, high input/output characteristics with which charge and discharge can be frequently repeated are required, and for that purpose, it is important to reduce the resistance. In addition, the electrical storage device is required to have durability under high temperature because a temperature in the car sometimes reaches a high temperature of 50° C. or more in summer.

Under such background, various binder materials have been proposed with a view to reducing a resistance of the electrical storage device and improving a charge-discharge durability characteristic thereof (see, for example, Patent Literatures 1 and 2).

CITATION LIST

Patent Literature

[PTL 1] WO 2015/012366 A1
[PTL 2] JP 2017-126456 A

SUMMARY OF INVENTION

Technical Problem

However, the binder materials disclosed in Patent Literatures 1 and 2 described above are not sufficient in terms of repeated charge-discharge characteristic and durability under high temperature, and have been required to be further improved in order to be applied to an electrical storage device serving as a driving power source for an electric car.

In view of the foregoing, some aspects according to the present invention provide a binder composition for an electrical storage device, which enables the production of an electrical storage device electrode excellent in repeated charge-discharge characteristic through a reduction in internal resistance and also excellent in charge-discharge durability characteristic under high temperature through an improvement in adhesiveness. In addition, some aspects according to the present invention provide a slurry for an electrical storage device electrode, which contains the binder composition. In addition, some aspects according to the present invention provide an electrical storage device electrode excellent in repeated charge-discharge characteristic through a reduction in internal resistance and also excellent in charge-discharge durability characteristic under high temperature through an improvement in adhesiveness. Further, some aspects according to the present invention provide an electrical storage device excellent in repeated charge-discharge characteristic and also excellent in charge-discharge durability characteristic under high temperature.

Solution to Problem

The present invention has been made in order to solve at least part of the above-mentioned problems, and can be realized as any one of the following aspects.

According to one aspect of the present invention, there is provided a binder composition for an electrical storage device, including: a polymer (A); and a liquid medium (B), wherein, with respect to 100 mass % in total of repeating units contained in the polymer (A), the polymer (A) contains: 15 mass % to 60 mass % of a repeating unit (a1) derived from a conjugated diene compound; and 1 mass % to 10 mass % of a repeating unit (a2) derived from an unsaturated carboxylic acid, wherein tan δ (loss elastic modulus/storage elastic modulus) in dynamic viscoelasticity of the polymer (A) has one peak top in a range of from −40° C. or more to less than 50° C., and has one peak top in a range of from 50° C. or more to 150° C. or less, and wherein, when the tan δ at the peak top in the range of from −40° C. or more to less than 50° C. is represented by tan δ(Tp1), and the tan δ at the peak top in the range of from 50° C. or more to 150° C. or less is represented by tan δ(Tp2), a relationship of the following expression (1) is satisfied.

$$\tan \delta(Tp2)/\tan \delta(Tp1) \geq 0.5 \qquad (1)$$

In the binder composition for an electrical storage device according to the one aspect, the polymer (A) may further contain 35 mass % to 75 mass % of a repeating unit (a3) derived from an aromatic vinyl compound.

In this case, a total amount of the repeating unit (a1), the repeating unit (a2), and the repeating unit (a3) may be 80 mass % or more.

In the binder composition for an electrical storage device according to the one aspect, the polymer (A) may contain at least one of a repeating unit (a4) derived from an unsaturated carboxylic acid ester or a repeating unit (a5) derived from an α,β-unsaturated nitrile compound.

In this case, a total amount of the repeating unit (a1), the repeating unit (a2), the repeating unit (a4), and the repeating unit (a5) may be 65 mass % or more.

In the binder composition for an electrical storage device according to any one of the above-mentioned aspects, the polymer (A) may have a Martens hardness of 15 MPa or more, which is calculated using a picoindenter.

In the binder composition for an electrical storage device according to any one of the above-mentioned aspects, the polymer (A) may be polymer particles, and the polymer particles may have a number average particle diameter of 50 nm or more and 500 nm or less.

In the binder composition for an electrical storage device according to any one of the above-mentioned aspects, the liquid medium (B) may be water.

According to one aspect of the present invention, there is provided a slurry for an electrical storage device electrode, including: the binder composition for an electrical storage device of any one of the above-mentioned aspects; and an active material.

In the slurry for an electrical storage device electrode according to the one aspect, the active material may be a silicon material.

According to one aspect of the present invention, there is provided an electrical storage device electrode, including: a current collector; and an active material layer formed on a surface of the current collector by applying and drying the slurry for an electrical storage device electrode of any one of the above-mentioned aspects.

According to one aspect of the present invention, there is provided an electrical storage device, including the electrical storage device electrode of the above-mentioned aspect.

Advantageous Effects of Invention

The binder composition for an electrical storage device according to the present invention enables the production of an electrical storage device electrode that is excellent in repeated charge-discharge characteristic because internal resistance can be reduced, and is also excellent in charge-discharge durability characteristic under high temperature because adhesiveness can be improved. The binder composition for an electrical storage device according to the present invention exhibits the above-mentioned effect particularly when the electrical storage device electrode contains, as an active material, a material having a large lithium storage capacity, such as a carbon material like graphite or a silicon material. A material having a large lithium storage capacity can be used as the active material for the electrical storage device electrode as described above, and hence battery performance is improved as well.

BRIEF DESCRIPTION OF DRAWINGS

FIG. 1 is a graph showing a relationship between measurement temperature and tan δ in the dynamic viscoelasticity measurement of a film produced in Example 3.

DESCRIPTION OF EMBODIMENTS

Preferred embodiments of the present invention are described in detail below. It should be appreciated that the present invention is not limited to the following embodiments, and includes various modification examples performed within the scope that does not change the gist of the present invention.

Herein, "(meth)acrylic acid . . . " is a concept comprehending both of "acrylic acid . . . " and "methacrylic acid . . . ". Similarly, " . . . (meth)acrylate" is a concept comprehending both of " . . . acrylate" and " . . . methacrylate". Similarly, "(meth)acrylamide" is a concept comprehending both of "acrylamide" and "methacrylamide".

Herein, a numerical range described like "from A to B" is to be construed to include a numerical value A as a lower limit value and a numerical value B as an upper limit value.

Herein, "under high temperature" refers to an environment in the temperature range of roughly from 40° C. to 80° C.

1. Binder Composition for Electrical Storage Device

A binder composition for an electrical storage device according to one embodiment of the present invention contains a polymer (A) and a liquid medium (B). The polymer (A) contains, with respect to 100 mass % in total of repeating units contained in the polymer (A), 15 mass % to 60 mass % of a repeating unit (a1) derived from a conjugated diene compound, and 1 mass % to 10 mass % of a repeating unit (a2) derived from an unsaturated carboxylic acid. In addition, tan δ (loss elastic modulus/storage elastic modulus) in the dynamic viscoelasticity of the polymer (A) has one peak top in the range of from −40° C. or more to less than 50° C., and has one peak top in the range of from 50° C. or more to 150° C. or less. When the tan δ at the peak top in the range of from −40° C. or more to less than 50° C. is represented by tan δ(Tp1), and the tan δ at the peak top in the range of from 50° C. or more to 150° C. or less is represented by tan δ(Tp2), a relationship of the following expression (1) is satisfied.

$$\tan \delta(Tp2)/\tan \delta(Tp1) \geq 0.5 \tag{1}$$

The binder composition for an electrical storage device according to this embodiment may be used as a material for producing an electrical storage device electrode (active material layer) improved in binding ability between active materials and adhesive ability between the active material and a current collector, and in powder fall-off resistance, and may also be used as a material for forming a protective film for suppressing a short circuit due to dendrites generated along with charge and discharge. Each component contained in the binder composition for an electrical storage device according to this embodiment is described in detail below.

1.1. Polymer (A)

The binder composition for an electrical storage device according to this embodiment contains the polymer (A). The polymer (A) contains, with respect to 100 mass % in total of the repeating units contained in the polymer (A), 15 mass % to 60 mass % of a repeating unit (a1) derived from a conjugated diene compound (hereinafter sometimes referred to simply as "repeating unit (a1)"), and 1 mass % to 10 mass % of a repeating unit (a2) derived from an unsaturated carboxylic acid (hereinafter sometimes referred to simply as "repeating unit (a2)"). In addition, the polymer (A) may contain, in addition to the above-mentioned repeating units, a repeating unit derived from another monomer copolymerizable therewith.

The polymer (A) contained in the binder composition for an electrical storage device according to this embodiment may be in the form of latex dispersed in the liquid medium (B), or may be in a state of being dissolved in the liquid medium (B), but is preferably in the form of latex dispersed in the liquid medium (B). A case in which the polymer (A) is in the form of latex dispersed in the liquid medium (B) is preferred because the stability of a slurry for an electrical storage device electrode (hereinafter sometimes referred to simply as "slurry") produced by mixing the binder composition with an active material becomes satisfactory, and besides, the coating property of the slurry for a current collector becomes satisfactory.

The constituent repeating units of the polymer (A), the physical properties of the polymer (A), and a production method therefor are described below in the stated order.

1.1.1. Constituent Repeating Units of Polymer (A)

1.1.1.1. Repeating Unit (a1) Derived from Conjugated Diene Compound

The content ratio of the repeating unit (a1) derived from a conjugated diene compound is from 15 mass % to 60 mass % with respect to 100 mass % in total of the repeating units contained in the polymer (A). The lower limit of the content ratio of the repeating unit (a1) is preferably 17 mass %, more preferably 20 mass %. The upper limit of the content ratio of the repeating unit (a1) is preferably 57 mass %, more preferably 55 mass %. When the polymer (A) contains the repeating unit (a1) within the above-mentioned ranges, the dispersibility of an active material or a filler becomes satisfactory to enable the production of a uniform active material layer or protective film, and hence a structural defect of an electrode plate is eliminated, with the result that a satisfactory repeated charge-discharge characteristic is shown. In addition, stretching and shrinking properties can be imparted to the polymer (A) covering the surface of the active material, and adhesiveness can be improved by virtue of stretching and shrinking of the polymer (A), with the result that a satisfactory charge-discharge durability characteristic is shown.

The conjugated diene compound is not particularly limited, but examples thereof may include 1,3-butadiene, 2-methyl-1,3-butadiene, 2,3-dimethyl-1,3-butadiene, and 2-chloro-1,3-butadiene, and one or more kinds selected therefrom may be used. Of those, 1,3-butadiene is particularly preferred.

1.1.1.2. Repeating Unit (a2) Derived from Unsaturated Carboxylic Acid

The content ratio of the repeating unit (a2) derived from an unsaturated carboxylic acid is from 1 mass % to 10 mass % with respect to 100 mass % in total of the repeating units contained in the polymer (A). The lower limit of the content ratio of the repeating unit (a2) is preferably 1.2 mass %, more preferably 1.5 mass %. The upper limit of the content ratio of the repeating unit (a2) is preferably 9 mass %, more preferably 8 mass %. When the polymer (A) contains the repeating unit (a2) within the above-mentioned ranges, the dispersibility of an active material or a filler becomes satisfactory. In addition, affinity for a silicon material to be used as the active material is improved to reduce swelling of the silicon material, and hence a satisfactory charge-discharge durability characteristic is shown.

The unsaturated carboxylic acid is not particularly limited, but examples thereof may include monocarboxylic acids and dicarboxylic acids (including anhydrides), such as acrylic acid, methacrylic acid, crotonic acid, maleic acid, fumaric acid, and itaconic acid, and one or more kinds selected therefrom may be used. One or more kinds selected from acrylic acid, methacrylic acid, and itaconic acid are each preferably used as the unsaturated carboxylic acid.

1.1.1.3. Other Repeating Units

The polymer (A) may contain, in addition to the repeating units (a1) and (a2), a repeating unit derived from another monomer copolymerizable therewith. Examples of such repeating unit include: a repeating unit (a3) derived from an aromatic vinyl compound (hereinafter sometimes referred to simply as "repeating unit (a3)"); a repeating unit (a4) derived from an unsaturated carboxylic acid ester (hereinafter sometimes referred to simply as "repeating unit (a4)"); a repeating unit (a5) derived from an $\alpha,\beta$-unsaturated nitrile compound (hereinafter sometimes referred to simply as "repeating unit (a5)"); a repeating unit (a6) derived from (meth)acrylamide (hereinafter sometimes referred to simply as "repeating unit (a6)"); a repeating unit (a7) derived from a compound having a sulfonic acid group (hereinafter sometimes referred to simply as "repeating unit (a7)"); and a repeating unit derived from a cationic monomer.

<Repeating Unit (a3) Derived from Aromatic Vinyl Compound>

The content ratio of the repeating unit (a3) derived from an aromatic vinyl compound is preferably from 35 mass % to 75 mass % with respect to 100 mass % in total of the repeating units contained in the polymer (A). The lower limit of the content ratio of the repeating unit (a3) is preferably 38 mass %, more preferably 40 mass %. The upper limit of the content ratio of the repeating unit (a3) is preferably 72 mass %, more preferably 70 mass %. When the polymer (A) contains the repeating unit (a3) within the above-mentioned ranges, fusion between particles of the polymer (A) dispersed in an electrode is reduced to improve the permeability of an electrolytic solution, and hence a satisfactory repeated charge-discharge characteristic is shown in some cases. Further, a satisfactory binding force for graphite or the like used as an active material is exhibited in some cases, and hence an electrical storage device electrode excellent in adhesiveness is obtained.

The aromatic vinyl compound is not particularly limited, but examples thereof may include styrene, $\alpha$-methylstyrene, p-methylstyrene, vinyltoluene, chlorostyrene, and divinylbenzene, and one or more kinds selected therefrom may be used.

When the polymer (A) contains the repeating unit (a3) derived from an aromatic vinyl compound, the total amount of the repeating unit (a1), the repeating unit (a2), and the repeating unit (a3) is preferably 80 mass % or more, more preferably 85 mass % or more with respect to 100 mass % in total of the repeating units contained in the polymer (A). When the total amount of the repeating unit (a1), the repeating unit (a2), and the repeating unit (a3) falls within the above-mentioned ranges, the dispersibility of an active material or a filler becomes satisfactory. In addition, fusion between particles of the polymer (A) dispersed in an electrode can be reduced to improve adhesiveness and the permeability of an electrolytic solution. Accordingly, a satisfactory repeated charge-discharge characteristic and a satisfactory charge-discharge durability characteristic are shown.

<Repeating Unit (a4) Derived from Unsaturated Carboxylic Acid Ester>

The polymer (A) may contain the repeating unit (a4) derived from an unsaturated carboxylic acid ester. The content ratio of the repeating unit (a4) is preferably from 0 mass % to 60 mass % with respect to 100 mass % in total of the repeating units contained in the polymer (A). The lower limit of the content ratio of the repeating unit (a4) is preferably 1 mass %, more preferably 2 mass %. The upper limit of the content ratio of the repeating unit (a4) is preferably 55 mass %, more preferably 50 mass %. When the polymer (A) contains the repeating unit (a4) within the above-mentioned ranges, affinity between the polymer (A) and an electrolytic solution becomes satisfactory, and hence an increase in internal resistance caused by a binder serving as an electrical resistance component in an electrical storage device can be reduced, and besides, a decrease in adhesiveness due to excessive absorption of the electrolytic solution can be prevented in some cases.

Of the unsaturated carboxylic acid esters, a (meth)acrylic acid ester may be preferably used. Specific examples of the (meth)acrylic acid ester include methyl (meth)acrylate, ethyl (meth)acrylate, n-propyl (meth)acrylate, isopropyl (meth) acrylate, n-butyl (meth)acrylate, isobutyl (meth)acrylate, n-amyl (meth)acrylate, isoamyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, ethylene glycol di(meth)acrylate, propylene glycol di(meth)acrylate, trimethylolpropane tri (meth)acrylate, pentaerythritol tetra(meth)acrylate, dipentaerythritol hexa(meth)acrylate, allyl (meth)acrylate, 2-hydroxymethyl (meth)acrylate, 2-hydroxyethyl (meth) acrylate, 2-hydroxypropyl (meth)acrylate, 3-hydroxypropyl (meth)acrylate, 4-hydroxybutyl (meth)acrylate, 5-hydroxypentyl (meth)acrylate, 6-hydroxyhexyl (meth)acrylate, glycerin mono(meth)acrylate, and glycerin di(meth)acrylate, and one or more kinds selected therefrom may be used. Of those, one or more kinds selected from methyl (meth)acrylate, ethyl (meth)acrylate, n-butyl (meth)acrylate, 2-ethylhexyl (meth)acrylate, cyclohexyl (meth)acrylate, ethylene glycol di(meth)acrylate, and 2-hydroxyethyl (meth)acrylate are preferred, and methyl (meth)acrylate is particularly preferred.

<Repeating Unit (a5) Derived from α,β-Unsaturated Nitrile Compound>

The polymer (A) may contain the repeating unit (a5) derived from an α,β-unsaturated nitrile compound. The content ratio of the repeating unit (a5) is preferably from 0 mass % to 60 mass % with respect to 100 mass % in total of the repeating units contained in the polymer (A). The lower limit of the content ratio of the repeating unit (a5) is preferably 0.5 mass %, more preferably 1 mass %. The upper limit of the content ratio of the repeating unit (a5) is preferably 55 mass %, more preferably 50 mass %. When the polymer (A) contains the repeating unit (a5) within the above-mentioned ranges, the dissolution of the polymer (A) in an electrolytic solution can be reduced, and hence a decrease in adhesiveness due to the electrolytic solution can be reduced in some cases. In addition, an increase in internal resistance caused by a dissolved polymer component serving as an electrical resistance component in an electrical storage device can be reduced in some cases.

The α,β-unsaturated nitrile compound is not particularly limited, but examples thereof may include acrylonitrile, methacrylonitrile, α-chloroacrylonitrile, α-ethylacrylonitrile, and vinylidene cyanide, and one or more kinds selected therefrom may be used. Of those, one or more kinds selected from the group consisting of: acrylonitrile; and methacrylonitrile are preferred, and acrylonitrile is particularly preferred.

When the polymer (A) contains at least one of the repeating unit (a4) derived from an unsaturated carboxylic acid ester or the repeating unit (a5) derived from an α,β-unsaturated nitrile compound, the total amount of the repeating unit (a1), the repeating unit (a2), the repeating unit (a4), and the repeating unit (a5) is preferably 65 mass % or more, more preferably 68 mass % or more with respect to 100 mass % in total of the repeating units contained in the polymer (A). When the total amount of the repeating unit (a1), the repeating unit (a2), the repeating unit (a4), and the repeating unit (a5) falls within the above-mentioned ranges, the dispersibility of an active material or a filler becomes satisfactory. In addition, fusion between particles of the polymer (A) dispersed in an electrode can be reduced to improve adhesiveness and the permeability of an electrolytic solution. Accordingly, a satisfactory repeated charge-discharge characteristic and a satisfactory charge-discharge durability characteristic are shown.

<Repeating Unit (a6) Derived from (Meth)Acrylamide>

The polymer (A) may contain the repeating unit (a6) derived from (meth)acrylamide. The content ratio of the repeating unit (a6) is preferably from 0 mass % to 10 mass % with respect to 100 mass % in total of the repeating units contained in the polymer (A). The lower limit of the content ratio of the repeating unit (a6) is preferably 1 mass %, more preferably 2 mass %. The upper limit of the content ratio of the repeating unit (a6) is preferably 8 mass %, more preferably 5 mass %. When the polymer (A) contains the repeating unit (a6) within the above-mentioned ranges, the dispersibility of an active material or a filler in a slurry becomes satisfactory in some cases. In addition, an active material layer to be obtained has moderate flexibility, resulting in an improvement in adhesiveness between a current collector and the active material layer in some cases. Further, a binding ability between active materials containing a carbon material like graphite and a silicon material can be enhanced, and hence an active material layer that is more satisfactory in terms of flexibility and adhesiveness for a current collector is obtained in some cases.

The (meth)acrylamide is not particularly limited, but examples thereof may include acrylamide, methacrylamide, N-isopropylacrylamide, N,N-dimethylacrylamide, N,N-dimethylmethacrylamide, N,N-diethylacrylamide, N,N-diethylmethacrylamide, N,N-dimethylaminopropylacrylamide, N,N-dimethylaminopropylmethacrylamide, N-methylolacrylamide, N-methylolmethacrylamide, diacetone acrylamide, maleic acid amide, and acrylamide tert-butylsulfonic acid, and one or more kinds selected therefrom may be used.

<Repeating Unit (a7) Derived from Compound Having Sulfonic Acid Group>

The polymer (A) may contain the repeating unit (a7) derived from a compound having a sulfonic acid group. The content ratio of the repeating unit (a7) is preferably from 0 mass % to 10 mass % with respect to 100 mass % in total of the repeating units contained in the polymer (A). The lower limit of the content ratio of the repeating unit (a7) is preferably 0.5 mass %, more preferably 1 mass %. The upper limit of the content ratio of the repeating unit (a7) is preferably 8 mass %, more preferably 5 mass %.

The compound having a sulfonic acid group is not particularly limited, but examples thereof include compounds, such as vinylsulfonic acid, styrenesulfonic acid, allylsulfonic acid, sulfoethyl (meth)acrylate, sulfopropyl (meth)acrylate, sulfobutyl (meth)acrylate, 2-acrylamido-2-methylpropanesulfonic acid, 2-hydroxy-3-acrylamidopropanesulfonic acid, and 3-allyloxy-2-hydroxypropanesulfonic acid, and alkali salts thereof, and one or more kinds selected therefrom may be used.

<Repeating Unit Derived from Cationic Monomer>

The polymer (A) may contain the repeating unit derived from a cationic monomer. The cationic monomer is not particularly limited, but is preferably at least one kind of monomer selected from the group consisting of: a secondary amine (salt); a tertiary amine (salt); and a quaternary ammonium salt. Specific examples of those cationic monomers include, but not particularly limited to, 2-(dimethylamino) ethyl (meth)acrylate, dimethylaminoethyl (meth)acrylate methyl chloride quaternary salt, 2-(diethylamino)ethyl (meth)acrylate, 3-(dimethylamino)propyl (meth)acrylate, 3-(diethylamino)propyl (meth)acrylate, 4-(dimethylamino) phenyl (meth)acrylate, 2-[(3,5-dimethylpyrazolyl)carbonylamino]ethyl (meth)acrylate, 2-(0-[1'-methylpropylideneamino]carboxyamino)ethyl (meth)acrylate, 2-(1-aziridinyl)ethyl (meth)acrylate, methacryloylcholine chloride, tris(2-acryloyloxyethyl) isocyanurate, 2-vinylpyridine, quinaldine red, 1,2-di(2-pyridyl)ethylene, 4'-hydrazino-2-stilbazole dihydrochloride hydrate, 4-(4-dimethylaminostyryl)quinoline, 1-vinylimidazole, diallylamine, diallylamine hydrochloride, triallylamine, diallyldimethylammonium chloride, dichlormid, N-allylbenzylamine, N-allylaniline, 2,4-diamino-6-diallylamino-1,3,5-triazine, N-trans-cinnamyl-N-methyl-(1-naphthylmethyl)amine hydrochloride, and trans-N-(6,6-dimethyl-2-hepten-4-yl)-N-methyl-1-naphthylmethylamine hydrochloride, and one or more kinds selected therefrom may be used.

1.1.2. Physical Properties of Polymer (A)

1.1.2.1. Dynamic Viscoelasticity

When the dynamic viscoelasticity of the polymer (A) is measured, tan δ (loss elastic modulus/storage elastic modulus) has one peak top in the range of from −40° C. or more to less than 50° C., and has one peak top in the range of from 50° C. or more to 150° C. or less. Further, when the tan δ at the peak top in the range of from −40° C. or more to less than 50° C. is represented by tan δ(Tp1), and the tan δ at the peak top in the range of from 50° C. or more to 150° C. or less is represented by tan δ(Tp2), a relationship of the following expression (1) is satisfied.

$$\tan \delta(Tp2)/\tan \delta(Tp1) \geq 0.5 \tag{1}$$

A measurement sample in the dynamic viscoelasticity measurement is a film of the polymer (A). The film of the polymer (A) is obtained by drying the polymer (A) at 40° C. for 24 hours to produce a uniform film having a thickness of 1.0±0.3 mm, drying the film in a vacuum dryer at 160° C. for 30 minutes, and then cutting the resultant into a strip shape measuring 10 mm by 10 mm. Then, measurement is performed using the following dynamic viscoelasticity-measuring apparatus with the measurement sample being fixed with parallel plates (product name: "PP-12") under the following measurement conditions in the temperature region of from −70° C. to 180° C.

Measurement conditions: shear mode, measurement frequency: 0.01 Hz to 1 Hz, temperature increase speed: 0.1° C./min Dynamic viscoelasticity-measuring apparatus: manufactured by Anton Paar, model: "MCR 301"

The "tan δ(Tp2)/tan δ(Tp1)" value of the polymer (A) to be used in this embodiment is 0.5 or more, preferably 0.75 or more, more preferably 1 or more. When the "tan δ(Tp2)/ tan δ(Tp1)" value of the polymer (A) falls within the above-mentioned ranges, it is indicated that its viscosity is high at a temperature around the peak top temperature of the tan δ(Tp1), and it is conceived that adhesiveness can be secured by virtue of the high viscosity. It is also indicated that the polymer (A) is highly crosslinked, i.e., hard, at a temperature around the peak top temperature of the tan δ(Tp2), and it is conceived that, by virtue of the polymer (A) being hard, its particle shape can be maintained without being crushed like other binders at the time of the production of an electrode, and hence the permeability of an electrolytic solution into an active material can be enhanced. Thus, the polymer (A) to be used in this embodiment can reduce internal resistance by enhancing the permeability of the electrolytic solution into the active material, and hence enables the production of an electrode showing a satisfactory repeated charge-discharge characteristic. In addition, the polymer (A) to be used in this embodiment can improve adhesiveness, and hence enables the production of an electrode showing a satisfactory charge-discharge durability characteristic under high temperature.

The temperature Tp1 (° C.) of the peak top of the tan δ in the dynamic viscoelasticity measurement of the polymer (A) is preferably present in the temperature range of preferably from −35° C. or more to 45° C. or less, more preferably from −30° C. or more to 40° C. or less. In addition, it is preferred that one peak top be present in the above-mentioned temperature ranges. The presence of one Tp in the above-mentioned temperature ranges indicates that the viscosity is high in those temperature ranges. It is conceived that, by virtue of the high viscosity, the high binding force of the polymer (A) in those temperature ranges can be maintained, and satisfactory adhesiveness can be expressed.

The temperature Tp2 (° C.) of the peak top of the tan δ in the dynamic viscoelasticity measurement of the polymer (A) is preferably present in the temperature range of preferably from 60° C. or more to 145° C. or less, more preferably from 70° C. or more to 140° C. or less. In addition, it is preferred that one peak top be present in the above-mentioned temperature ranges. The presence of one Tp in the above-mentioned temperature ranges indicates that a polymer having uniformly crosslinked composition is formed in those temperature ranges. It is conceived that, when the uniformly crosslinked composition amount of the polymer (A) in those temperature ranges is large, the hardness of the polymer (A) can be expressed to reduce internal resistance.

As a method of adjusting the temperature Tp of the peak top of the tan δ, there is given, for example, a method involving adjusting monomer composition at the time of the polymerization of the polymer (A).

The tan δ(Tp1) of the polymer (A) is preferably from 0.01 to 0.5, more preferably from 0.01 to 0.45, particularly preferably from 0.01 to 0.4. The tan δ(Tp1) of the polymer (A) falling within the above-mentioned ranges indicates that the polymer (A) has viscosity, but is not excessively hard and has a binding force sufficient for keeping an electrode structure.

The tan δ(Tp2) of the polymer (A) is preferably from 0.1 to 3, more preferably from 0.2 to 2.5, particularly preferably from 0.3 to 2. The tan δ(Tp2) of the polymer (A) falling within the above-mentioned ranges indicates that the polymer (A) is not excessively soft and has a sufficient hardness for reducing fusion between its particles.

A method of adjusting the tan δ(Tp) involves, for example, changing the glass transition temperature or gel content of the polymer (A), or changing a monomer addition method at the time of the polymerization of the polymer (A).

1.1.2.2. Martens Hardness

The Martens hardness of the polymer (A) to be used in this embodiment calculated using a picoindenter is preferably 15 MPa or more, more preferably 20 MPa or more, particularly preferably 25 MPa or more. The Martens hardness of the polymer (A) falling within the above-mentioned ranges indicates that the polymer (A) is hard, and it is conceived that, by virtue of the polymer (A) being hard, its particle shape can be maintained without being crushed like other binders at the time of the production of an electrode, and hence the permeability of an electrolytic solution into an active material can be enhanced. Such polymer (A) can reduce internal resistance by enhancing the permeability of the electrolytic solution into the active material, and hence enables the production of an electrode showing a satisfactory repeated charge-discharge characteristic.

The Martens hardness of the polymer (A) may be measured using a picoindenter. A measurement sample for the picoindenter is a thin film of the polymer (A). The thin film of the polymer (A) is obtained by adding about 1 g of the polymer (A) onto a Si wafer measuring 1 cm by 1 cm, forming a coating film through use of spin coating with the following apparatus and under the following conditions, and drying the coating film on a hot plate at 150° C. for 30 minutes. The Martens hardness is calculated for the measurement sample with the following picoindenter under the following test conditions.

Spin conditions of spin coating: Coating was performed in accordance with the following conditions: 150 rpm×5 seconds, 250 rpm×5 seconds, and 1,000 rpm×30 seconds.

Spin coating apparatus: Mikasa Co., Ltd., model: "MS-A-150"

Picoindenter test conditions: Indentation was performed at a pressure of 0.1 mN for 5 seconds, kept for 1 second, and then released over 5 seconds.

Picoindenter apparatus: manufactured by Helmut Fischer, model: "HM500"

1.1.2.3. Number Average Particle Diameter

When the polymer (A) is particles, the number average particle diameter of the particles is preferably 50 nm or more and 500 nm or less, more preferably 60 nm or more and 450 nm or less, particularly preferably 70 nm or more and 400 nm or less. When the number average particle diameter of the particles of the polymer (A) falls within the above-mentioned ranges, the particles of the polymer (A) are easily adsorbed onto the surface of the active material, and hence the particles of the polymer (A) can also move following the movement of the active material. As a result, migration can be suppressed, and hence a degradation in electrical characteristic can be reduced in some cases.

The number average particle diameter of the particles of the polymer (A) may be calculated from the average value of particle diameters obtained from images of the 50 particles observed with a transmission electron microscope (TEM). An example of the transmission electron microscope is "H-7650" manufactured by Hitachi High-Technologies Corporation.

1.1.2.4. Electrolytic Solution Swelling Degree

The electrolytic solution swelling degree of the polymer (A) is preferably from 100 mass % to 500 mass %, more preferably from 120 mass % to 450 mass %, particularly preferably from 140 mass % to 400 mass %. When the electrolytic solution swelling degree falls within the above-mentioned ranges, the polymer (A) can swell moderately with an electrolytic solution. As a result, solvated lithium ions can easily reach an active material, and hence a more satisfactory repeated charge-discharge characteristic can be achieved through a reduction in internal resistance of an electrode. In addition, with the electrolytic solution swelling degree within the above-mentioned ranges, the polymer (A) does not cause a large volume change, and hence is excellent in adhesiveness. The electrolytic solution swelling degree of the polymer (A) may be measured by a method described in Examples to be described later.

1.1.3. Production Method for Polymer (A)

A production method for the polymer (A) is not particularly limited, but for example, the polymer (A) may be produced by an emulsion polymerization method to be performed in the presence of a known emulsifier (surfactant), chain transfer agent, polymerization initiator, and the like. Compounds described in JP 5999399 B2 and the like may be used as the emulsifier (surfactant), the chain transfer agent, and the polymerization initiator.

The emulsion polymerization method for synthesizing the polymer (A) may be performed by one-stage polymerization, or may be performed by multistage polymerization involving two or more stages of polymerization.

When the synthesis of the polymer (A) is performed by one-stage polymerization, a mixture of the above-mentioned monomers may be subjected to emulsion polymerization in the presence of an appropriate emulsifier, chain transfer agent, polymerization initiator, and the like at preferably from 40° C. to 80° C. for preferably from 4 hours to 36 hours.

When the synthesis of the polymer (A) is performed by two-stage polymerization, the polymerization of each stage is preferably set as described below.

The use ratio of monomers to be used in the first stage polymerization is set to fall within preferably the range of from 20 mass % to 100 mass %, more preferably the range of from 25 mass % to 100 mass % with respect to the total mass of monomers (sum of the mass of the monomers to be used in the first stage polymerization and the mass of monomers to be used in the second stage polymerization). A case in which the first stage polymerization is performed at such use ratio of the monomers is preferred because, in this case, particles of the polymer (A) that are excellent in dispersion stability, and hence hardly cause aggregation can be obtained, and besides, an increase in viscosity of the binder composition for an electrical storage device over time is reduced.

The kinds and use ratio of the monomers to be used in the second stage polymerization may be the same as or different from the kinds and use ratio of the monomers to be used in the first stage polymerization.

Polymerization conditions in each stage are preferably set as described below from the viewpoint of the dispersibility of the particles of the polymer (A) to be obtained.

First stage polymerization: a temperature of preferably from 40° C. to 80° C.; a polymerization time of preferably from 2 hours to 36 hours; and a polymerization conversion rate of preferably 50 mass % or more, more preferably 60 mass % or more.

Second stage polymerization: a temperature of preferably from 40° C. to 80° C.; and a polymerization time of preferably from 2 hours to 18 hours.

When a total solid content concentration in the emulsion polymerization is set to 50 mass % or less, the polymerization reaction can be allowed to proceed under a state in which the dispersion stability of the particles of the polymer (A) to be obtained is satisfactory. The total solid content concentration is preferably 48 mass % or less, more preferably 45 mass % or less.

Irrespective of whether the synthesis of the polymer (A) is performed as one-stage polymerization or by a two-stage polymerization method, after the completion of the emulsion polymerization, a neutralizer is preferably added to the polymerization mixture to adjust its pH to from about 4.5 to about 10.5, preferably from 5 to 10, more preferably from 5.5 to 9.5. The neutralizer to be used in this case is not particularly limited, but examples thereof include: metal hydroxides, such as sodium hydroxide and potassium hydroxide; and ammonia. When the pH is set to fall within the above-mentioned ranges, the stability of the polymer (A) becomes satisfactory. When the polymerization mixture is subjected to neutralization treatment before being concentrated, its solid content concentration can be increased while satisfactory stability of the polymer (A) is maintained.

1.1.4. Content Ratio of Polymer (A)

The content ratio of the polymer (A) in the binder composition for an electrical storage device according to this embodiment is preferably from 10 mass % to 100 mass %, more preferably from 20 mass % to 95 mass %, particularly preferably from 25 mass % to 90 mass % in 100 mass % of a polymer component. Herein, the polymer component includes the polymer (A), and for example, a polymer other than the polymer (A) and a thickener, which are described later.

1.2. Liquid Medium (B)

The binder composition for an electrical storage device according to this embodiment contains the liquid medium (B). The liquid medium (B) is preferably an aqueous medium containing water, and is more preferably water. The aqueous medium may contain a non-aqueous medium other than water. Examples of the non-aqueous medium may include an amide compound, a hydrocarbon, an alcohol, a ketone, an ester, an amine compound, a lactone, a sulfoxide, and a sulfone compound, and one or more kinds selected therefrom may be used. When the binder composition for an electrical storage device according to this embodiment uses the aqueous medium as the liquid medium (B), the binder composition adversely affects an environment to a less degree and is highly safe for a worker who handles the binder composition.

The content ratio of the non-aqueous medium in the aqueous medium is preferably 10 mass % or less, more preferably 5 mass % or less in 100 mass % of the aqueous medium. It is particularly preferred that the aqueous medium be substantially free of the non-aqueous medium. Herein, the phrase "be substantially free" merely means that the non-aqueous medium is not intentionally added as the liquid medium, and the aqueous medium may contain the non-aqueous medium that is inevitably mixed during the preparation of the binder composition for an electrical storage device.

1.3. Other Additives

The binder composition for an electrical storage device according to this embodiment may contain an additive other than the above-mentioned components as required. Examples of such additive include a polymer other than the polymer (A), a preservative, and a thickener.

1.3.1. Polymer Other than Polymer (A)

The binder composition for an electrical storage device according to this embodiment may contain a polymer other than the polymer (A). Such polymer is not particularly limited, but examples thereof include: an acrylic polymer containing an unsaturated carboxylic acid ester or a derivative thereof as a constituent unit; and a fluoropolymer such as polyvinylidene fluoride (PVDF). Those polymers may be used alone or in combination thereof. The incorporation of any such polymer further improves flexibility and adhesiveness in some cases.

1.3.2. Preservative

The binder composition for an electrical storage device according to this embodiment may contain a preservative. The incorporation of the preservative can reduce the generation of foreign matter due to the growth of bacteria, mold, or the like during the storage of the binder composition for an electrical storage device in some cases. Specific examples of the preservative include compounds described in JP 5477610 B 1.

1.3.3. Thickener

The binder composition for an electrical storage device according to this embodiment may contain a thickener. The incorporation of the thickener can further improve the coating property of a slurry, the charge-discharge characteristic of an electrical storage device to be obtained, and the like in some cases.

Specific examples of the thickener may include: cellulose compounds, such as carboxymethyl cellulose, methyl cellulose, and hydroxypropyl cellulose; poly(meth)acrylic acid; ammonium salts or alkali metal salts of the cellulose compound or the poly(meth)acrylic acid; polyvinyl alcohol-based (co)polymers, such as polyvinyl alcohol, modified polyvinyl alcohol, and an ethylene-vinyl alcohol copolymer; and water-soluble polymers such as a saponified product of a copolymer of an unsaturated carboxylic acid, such as (meth)acrylic acid, maleic acid, or fumaric acid, and a vinyl ester. Of those, an alkali metal salt of carboxymethyl cellulose, an alkali metal salt of poly(meth)acrylic acid, and the like are preferred.

As commercially available products of those thickeners, there may be given, for example, alkali metal salts of carboxymethyl cellulose, such as CMC 1120, CMC 1150, CMC 2200, CMC 2280, and CMC 2450 (all of which are manufactured by Daicel Corporation).

When the binder composition for an electrical storage device according to this embodiment contains the thickener, the content ratio of the thickener is preferably 5 mass % or less, more preferably from 0.1 mass % to 3 mass % with respect to 100 mass % of the total solid content of the binder composition for an electrical storage device.

1.4. pH of Binder Composition for Electrical Storage Device

The pH of the binder composition for an electrical storage device according to this embodiment is preferably from 5 to 10, more preferably from 6 to 9.5, particularly preferably from 6.5 to 9. When the pH falls within the above-mentioned ranges, the occurrence of a problem such as lack of a leveling property or liquid dripping can be reduced to facilitate the production of an electrical storage device electrode achieving both a satisfactory electrical characteristic and satisfactory adhesiveness.

Herein, the "pH" refers to a physical property measured as described below: a value measured at 25° C. in conformity to JIS Z8802:2011 with a pH meter using a glass electrode calibrated with a neutral phosphate standard solution and a borate standard solution serving as pH standard solutions. Examples of such pH meter include "HM-7J" manufactured by DKK-TOA Corporation and "D-51" manufactured by Horiba, Ltd.

It is not denied that the pH of the binder composition for an electrical storage device is affected by the composition of the constituent monomers of the polymer (A), but it should be noted that the pH is not determined by the monomer composition alone. That is, it is known that the pH of a binder composition for an electrical storage device generally varies depending on polymerization conditions and the like even for the same monomer composition, and Examples herein are merely some examples thereof.

For example, even for the same monomer composition, the case of loading all the unsaturated carboxylic acid into a polymerization reaction liquid at the beginning, and then sequentially adding the other monomers, and the case of loading the monomers other than the unsaturated carboxylic acid into a polymerization reaction liquid, and finally adding the unsaturated carboxylic acid give different amounts of carboxy groups derived from the unsaturated carboxylic acid exposed on the surface of the polymer to be obtained. Thus, it is conceivable that the pH of the binder composition for an electrical storage device is significantly changed merely by changing the order in which the monomers are added in the polymerization method.

2. Slurry for Electrical Storage Device

A slurry for an electrical storage device according to one embodiment of the present invention contains the above-mentioned binder composition for an electrical storage device. The above-mentioned binder composition for an electrical storage device may be used as a material for producing a protective film for suppressing a short circuit due to dendrites generated along with charge and discharge, and may also be used as a material for producing an electrical storage device electrode (active material layer) improved in binding ability between active materials and adhesive ability between the active material and a current collector, and in powder fall-off resistance. For this reason, the slurry for an electrical storage device for producing a protective film (hereinafter sometimes referred to as "slurry for a protective film"), and the slurry for an electrical storage device for producing the active material layer of an electrical storage device electrode (hereinafter sometimes referred to as "slurry for an electrical storage device electrode") are separately described.

2.1. Slurry for Protective Film

The "slurry for a protective film" refers to a dispersion to be used for producing a protective film on the surface of an electrode or a separator, or the surfaces of both thereof by being applied to the surface of the electrode or the separator, or the surfaces of both thereof, and then dried. The slurry for a protective film according to this embodiment may consist only of the above-mentioned binder composition for an electrical storage device, or may further contain an inorganic filler. Each component contained in the slurry for a protective film according to this embodiment is described in detail below. The binder composition for an electrical storage device is as described above, and hence the description thereof is omitted.

2.1.1. Inorganic Filler

When the slurry for a protective film according to this embodiment contains the inorganic filler, the toughness of a protective film can be improved. As the inorganic filler, at least one kind of inorganic oxide particles selected from the group consisting of: silica; titanium oxide (titania); aluminum oxide (alumina); zirconium oxide (zirconia); and magnesium oxide (magnesia) are preferably used. Of those, titanium oxide particles or aluminum oxide particles are preferred from the viewpoint of further improving the toughness of the protective film. In addition, the titanium oxide is more preferably rutile-type titanium oxide.

The average particle diameter of the inorganic filler is preferably 1 μm or less, more preferably from 0.1 μm to 0.8 μm. The average particle diameter of the inorganic filler is preferably larger than the average pore diameter of the separator that is a porous film. With this configuration, damage to the separator can be alleviated and the inorganic filler can be prevented from clogging the fine pores of the separator.

The slurry for a protective film according to this embodiment contains preferably 0.1 part by mass to 20 parts by mass, more preferably 1 part by mass to 10 parts by mass of the above-mentioned binder composition for an electrical storage device in terms of solid content with respect to 100 parts by mass of the inorganic filler. When the content ratio of the binder composition for an electrical storage device falls within the above-mentioned ranges, the protective film strikes a satisfactory balance between toughness and lithium ion permeability, and as a result, the resistance increase rate of an electrical storage device to be obtained can be further reduced.

2.1.2. Liquid Medium

A liquid medium may be further added to the slurry for a protective film according to this embodiment in addition to the liquid medium included in the binder composition for an electrical storage device. The addition amount of the liquid medium may be adjusted as required so that the optimal slurry viscosity may be obtained in accordance with, for example, a coating method. Examples of such liquid medium include the materials described in the "1.2. Liquid Medium (B)" section.

2.1.3. Other Components

In the slurry for a protective film according to this embodiment, the materials described in the "1.3. Other Additives" section may be used in appropriate amounts as required.

2.2. Slurry for Electrical Storage Device Electrode

The "slurry for an electrical storage device electrode" refers to a dispersion to be used for producing an active material layer on the surface of a current collector by being applied to the surface of the current collector and then dried. The slurry for an electrical storage device electrode according to this embodiment contains the above-mentioned binder composition for an electrical storage device, and an active material.

In general, a slurry for an electrical storage device electrode often contains a binder component such as an SBR-based copolymer, and a thickener such as carboxymethyl cellulose, in order to improve adhesiveness. Meanwhile, the slurry for an electrical storage device electrode according to this embodiment can improve adhesiveness even in the case of containing only the above-mentioned polymer (A) as a polymer component. Of course, the slurry for an electrical storage device electrode according to this embodiment may contain a polymer other than the polymer (A) and a thickener in order to further improve adhesiveness. The components contained in the slurry for an electrical storage device electrode according to this embodiment are described below.

2.2.1. Polymer (A)

The composition, physical properties, production method, and the like of the polymer (A) are as described above, and hence the description thereof is omitted.

The content ratio of the polymer component in the slurry for an electrical storage device electrode according to this embodiment is preferably from 1 part by mass to 8 parts by mass, more preferably from 1 part by mass to 7 parts by mass, particularly preferably from 1.5 parts by mass to 6 parts by mass with respect to 100 parts by mass of the active material. When the content ratio of the polymer component falls within the above-mentioned ranges, the dispersibility of the active material in the slurry becomes satisfactory, and the coating property of the slurry becomes excellent. Herein, the polymer component includes the polymer (A), and for example, the polymer other than the polymer (A) and the thickener, which are added as required.

2.2.2. Active Material

Examples of the active material to be used for the slurry for an electrical storage device electrode according to this embodiment include a carbon material, a silicon material, an oxide containing a lithium atom, a lead compound, a tin compound, an arsenic compound, an antimony compound, an aluminum compound, a conductive polymer such as polyacene, a composite metal oxide represented by $A_xB_yO_z$ (where A represents an alkali metal or a transition metal, B represents at least one kind selected from transition metals, such as cobalt, nickel, aluminum, tin, and manganese, O represents an oxygen atom, and X, Y, and Z represent numbers in the ranges of $1.10>X>0.05$, $4.00>Y>0.85$, and $5.00>Z>1.5$, respectively), and other metal oxides. Specific examples thereof include compounds described in JP 5999399 B2.

The slurry for an electrical storage device electrode according to this embodiment may be used in the production of any one of electrical storage device electrodes including a positive electrode and a negative electrode, and is preferably used for both the positive electrode and the negative electrode.

In the case of using lithium iron phosphate as a positive electrode active material, there has been a problem in that the charge-discharge characteristic is not sufficient and the adhesiveness is poor. It is known that lithium iron phosphate has fine primary particle diameters, and is a secondary aggregate thereof. One conceivable cause of the problem is as follows: the aggregation collapses in the active material layer during repeated charge and discharge to cause separation between the active materials, with the result that peeling from a current collector, or disruption of a conductive network in the active material layer is liable to occur.

An electrical storage device electrode produced using the slurry for an electrical storage device electrode according to this embodiment can show a satisfactory electrical characteristic without the occurrence of such problem as described above even in the case of using lithium iron phosphate as the positive electrode active material. A conceivable reason therefor is that the polymer (A) can firmly bind lithium iron phosphate, and at the same time, can maintain the state of firmly binding lithium iron phosphate even during charge and discharge.

Meanwhile, when the negative electrode is produced, the slurry preferably contains the silicon material among the active materials given as examples above. The silicon material has a large lithium storage capacity per unit weight as compared to other active materials, and hence the incorporation of the silicon material as the negative electrode active material can increase the electrical storage capacity of an electrical storage device to be obtained. As a result, the output and energy density of the electrical storage device can be increased.

In addition, the negative electrode active material is more preferably a mixture of the silicon material and the carbon material. The carbon material undergoes a smaller volume change along with charge and discharge than the silicon material, and hence, through use of the mixture of the silicon material and the carbon material as the negative electrode active material, the influence of the volume change of the silicon material can be alleviated. Accordingly, the adhesive ability between the active material layer and a current collector can be further improved.

When silicon (Si) is used as the active material, silicon causes a large volume change when storing lithium, though having a high capacity. Accordingly, the silicon material has a property of being finely powdered through repeated expansion and contraction to cause peeling from a current collector, or separation between the active materials, with the result that disruption of a conductive network in the active material layer is liable to occur. With this property, the charge-discharge durability characteristic of the electrical storage device is extremely degraded within a short period of time.

An electrical storage device electrode produced using the slurry for an electrical storage device electrode according to this embodiment can show a satisfactory electrical characteristic without the occurrence of such problem as described above even in the case of using the silicon material. A conceivable reason therefor is that the polymer (A) can firmly bind the silicon material, and at the same time, even when the silicon material expands in volume by storing lithium, the polymer (A) can stretch and shrink to maintain the state of firmly binding the silicon material.

The content ratio of the silicon material in 100 mass % of the active material is set to preferably 1 mass % or more, more preferably from 2 mass % to 50 mass %, still more preferably from 3 mass % to 45 mass %, particularly preferably from 10 mass % to 40 mass %. When the content ratio of the silicon material in 100 mass % of the active material falls within the above-mentioned ranges, there is obtained an electrical storage device excellent in balance between the improvements in output and energy density of the electrical storage device, and the charge-discharge durability characteristic.

The active material preferably has a particulate shape. The average particle diameter of the active material is preferably from 0.1 μm to 100 μm, more preferably from 1 μm to 20 μm Herein, the average particle diameter of the active material refers to a volume average particle diameter calculated from a particle size distribution, the particle size distribution being measured with a particle size distribution-measuring apparatus employing a laser diffraction method as its measurement principle. Examples of such laser diffraction particle size distribution-measuring apparatus include the HORIBA LA-300 series and the HORIBA LA-920 series (which are manufactured by Horiba, Ltd.).

2.2.3. Other Components

In addition to the above-mentioned components, other components may be added to the slurry for an electrical storage device electrode according to this embodiment as required. Examples of such components include a polymer other than the polymer (A), a thickener, a liquid medium, a conductivity-imparting agent, a pH adjusting agent, a corrosion inhibitor, and a cellulose fiber. The polymer other than the polymer (A) and the thickener may be appropriately selected from the compounds given as examples in the "1.3. Other Additives" section, and may be used for similar purposes and at similar content ratios.

<Liquid Medium>

A liquid medium may be further added to the slurry for an electrical storage device electrode according to this embodiment in addition to the liquid medium included in the binder composition for an electrical storage device. The liquid medium to be added may be the same kind of liquid medium as the liquid medium (B) included in the binder composition for an electrical storage device or may be different therefrom, but a liquid medium selected from the liquid media given as examples in the "1.2. Liquid Medium (B)" section is preferably used.

The content ratio of the liquid medium (including the liquid medium included in the binder composition for an electrical storage device) in the slurry for an electrical storage device electrode according to this embodiment is set to such a ratio that the solid content concentration in the slurry (which refers to the ratio of the total mass of the components other than the liquid medium in the slurry to the total mass of the slurry. The same applies hereinafter.) becomes preferably from 30 mass % to 70 mass %, more preferably from 40 mass % to 60 mass %.

<Conductivity-Imparting Agent>

A conductivity-imparting agent may be further added to the slurry for an electrical storage device electrode according to this embodiment for the purposes of imparting conductivity and buffering the volume change of the active material caused by the entrance and exit of lithium ions.

Specific examples of the conductivity-imparting agent include carbons, such as activated carbon, acetylene black, ketjen black, furnace black, black lead, a carbon fiber, and fullerene. Of those, acetylene black or ketjen black may be preferably used. The content ratio of the conductivity-imparting agent is preferably 20 parts by mass or less, more preferably from 1 part by mass to 15 parts by mass, particularly preferably from 2 parts by mass to 10 parts by mass with respect to 100 parts by mass of the active material.

<pH Adjusting Agent/Corrosion Inhibitor>

A pH adjusting agent and/or a corrosion inhibitor may be further added to the slurry for an electrical storage device electrode according to this embodiment for the purpose of reducing the corrosion of a current collector depending on the kind of the active material.

Examples of the pH adjusting agent may include hydrochloric acid, phosphoric acid, sulfuric acid, acetic acid, formic acid, ammonium phosphate, ammonium sulfate, ammonium acetate, ammonium formate, ammonium chloride, sodium hydroxide, and potassium hydroxide. Of those, sulfuric acid, ammonium sulfate, sodium hydroxide, and potassium hydroxide are preferred. In addition, a pH adjusting agent selected from the neutralizers described in the production method for the polymer (A) may be used.

Examples of the corrosion inhibitor may include ammonium metavanadate, sodium metavanadate, potassium metavanadate, ammonium metatungstate, sodium metatungstate, potassium metatungstate, ammonium paratungstate, sodium paratungstate, potassium paratungstate, ammonium molybdate, sodium molybdate, and potassium molybdate. Of those, ammonium paratungstate, ammonium metavanadate, sodium metavanadate, potassium metavanadate, and ammonium molybdate are preferred.

<Cellulose Fiber>

A cellulose fiber may be further added to the slurry for an electrical storage device electrode according to this embodiment. The addition of the cellulose fiber can improve the adhesiveness of the active material with respect to a current collector in some cases. It is conceived that the fibrous cellulose fiber fibrously binds adjacent active materials to each other by linear adhesion or linear contact, and thus can prevent the detachment of the active material and can improve adhesiveness with respect to a current collector.

The average fiber length of the cellulose fiber may be selected from a wide range of from 0.1 μm to 1,000 μm, and is, for example, preferably from 1 μm to 750 μm, more preferably from 1.3 μm to 500 μm, still more preferably from 1.4 μm to 250 μm, particularly preferably from 1.8 μm to 25 μm. When the average fiber length falls within the above-mentioned ranges, surface smoothness (coating film uniformity) becomes satisfactory, and the adhesiveness of the active material with respect to a current collector is improved in some cases.

The fiber lengths of the cellulose fibers may be uniform, and the coefficient of variation of the fiber lengths ([standard deviation of fiber lengths/average fiber length]×100) is, for example, preferably from 0.1 to 100, more preferably from 0.5 to 50, particularly preferably from 1 to 30. The maximum fiber length of the cellulose fibers is, for example, preferably 500 μm or less, more preferably 300 μm or less, still more preferably 200 μm or less, still even more preferably 100 μm or less, particularly preferably 50 μm or less.

It is advantageous to set the average fiber length of the cellulose fiber to be 5 or less times as large as the average thickness of the active material layer because the surface smoothness (coating film uniformity) and the adhesiveness of the active material with respect to a current collector are further improved. The average fiber length of the cellulose fiber is preferably from 0.01 times to 5 times, more preferably from 0.02 times to 3 times, particularly preferably from 0.03 times to 2 times as large as the average thickness of the active material layer.

The average fiber diameter of the cellulose fiber is preferably from 1 nm to 10 μm, more preferably from 5 nm to 2.5 μm, still more preferably from 20 nm to 700 nm, particularly preferably from 30 nm to 200 nm. When the average fiber diameter falls within the above-mentioned ranges, the fiber does not occupy an excessively large volume, and hence the filling density of the active material can be increased in some cases. For this reason, the cellulose fiber is preferably a cellulose nanofiber of a nanometer size in terms of average fiber diameter (e.g., a cellulose nanofiber having an average fiber diameter of from 10 nm to 500 nm, preferably from about 25 nm to about 250 nm).

The fiber diameters of the cellulose fibers are also uniform, and the coefficient of variation of the fiber diameters ([standard deviation of fiber diameters/average fiber diameter]×100) is preferably from 1 to 80, more preferably from 5 to 60, particularly preferably from 10 to 50. The maximum fiber diameter of the cellulose fibers is preferably 30 μm or less, more preferably 5 μm or less, particularly preferably 1 μm or less.

The ratio of the average fiber length of the cellulose fiber to the average fiber diameter thereof (aspect ratio) is, for example, preferably from 10 to 5,000, more preferably from 20 to 3,000, particularly preferably from 50 to 2,000. When the aspect ratio falls within the above-mentioned ranges, the adhesiveness of the active material with respect to a current collector becomes satisfactory, and besides, the surface smoothness (coating film uniformity) of an electrode becomes satisfactory without weakening the breaking strength of the fiber in some cases.

In the present invention, the average fiber length, the standard deviation of fiber length distribution, the maximum fiber length, the average fiber diameter, the standard deviation of fiber diameter distribution, and the maximum fiber diameter may be values calculated from fibers (n=about 20) subjected to measurement based on electron micrographs.

A material for the cellulose fiber only needs to be formed of a polysaccharide having a β-1,4-glucan structure. Examples of the cellulose fiber include higher plant-derived cellulose fibers (e.g., natural cellulose fibers (pulp fibers), such as wood fibers (e.g., wood pulp of a needle-leaved tree or a broad-leaved tree), bamboo fibers, sugar cane fibers, seed hair fibers (e.g., cotton linter, bombax cotton, and kapok), bast fibers (e.g., hemp, kozo, and mitsumata), leaf fibers (e.g., Manila hemp and New Zealand hemp)), animal-derived cellulose fibers (e.g., ascidian cellulose), bacterium-derived cellulose fibers (e.g., cellulose contained in nata de coco), and chemically synthesized cellulose fibers (e.g., rayon, cellulose esters (e.g., cellulose acetate), and cellulose ethers (e.g., cellulose derivatives, for example, hydroxyalkyl celluloses, such as hydroxyethyl cellulose (HEC) and hydroxypropyl cellulose, and alkyl celluloses, such as methyl cellulose and ethyl cellulose)). Those cellulose fibers may be used alone or in combination thereof.

Of those cellulose fibers, from the viewpoint of the ease of preparation of a nanofiber having a moderate aspect ratio, higher plant-derived cellulose fibers, for example, pulp-derived cellulose fibers, such as wood fibers (e.g., wood pulp of a needle-leaved tree or a broad-leaved tree) and seed hair fibers (e.g., cotton linter pulp), are preferred.

A production method for the cellulose fiber is not particularly limited, and a commonly used method, for example, a method described in JP 60-19921 B2, JP 2011-26760 A, JP 2012-25833 A, JP 2012-36517 A, JP 2012-36518 A, JP 2014-181421 A, or the like may be utilized depending on the target fiber length and fiber diameter.

2.2.4. Preparation Method for Slurry for Electrical Storage Device Electrode The slurry for an electrical storage device electrode according to this embodiment may be a slurry produced by any method as long as the slurry contains the above-mentioned binder composition for an electrical storage device and an active material. From the viewpoint of more efficiently and inexpensively producing a slurry having more satisfactory dispersibility and stability, the slurry is preferably produced by adding the active material and optionally added components to be used as required to the binder composition for an electrical storage device, and mixing the components. A specific example of the production method is a method described in JP 5999399 B2 or the like.

3. Electrical Storage Device Electrode

An electrical storage device electrode according to one embodiment of the present invention includes a current collector and an active material layer formed on the surface of the current collector by applying and drying the above-mentioned slurry for an electrical storage device electrode. Such electrical storage device electrode may be produced by applying the above-mentioned slurry for an electrical storage device electrode to the surface of the current collector such as metal foil to form a coating film, and then drying the coating film to form the active material layer. The thus produced electrical storage device electrode has the active material layer, which contains the above-mentioned polymer (A) and active material, and optional components added as required, bound onto the surface of the current collector, and hence is excellent in repeated charge-discharge characteristic and also excellent in charge-discharge durability characteristic under high temperature.

The current collector is not particularly limited as long as the current collector is formed of a conductive material, but an example thereof is a current collector described in JP 5999399 B2 or the like.

When a silicon material is used as the active material in the electrical storage device electrode according to this embodiment, the content ratio of a silicon element in 100 mass % of the active material layer is preferably from 2 mass % to 30 mass %, more preferably from 2 mass % to 20 mass %, particularly preferably from 3 mass % to 10 mass %. When the content of the silicon element in the active material layer falls within the above-mentioned ranges, the electrical storage capacity of an electrical storage device produced through use thereof is improved, and besides, an active material layer in which the distribution of the silicon element is uniform is obtained. The content of the silicon element in the active material layer may be measured by, for example, a method described in JP 5999399 B2 or the like.

4. Electrical Storage Device

An electrical storage device according to one embodiment of the present invention includes the above-mentioned electrical storage device electrode and further contains an electrolytic solution, and may be produced in accordance with a conventional method using parts such as a separator. A specific example of the production method may be a method involving: stacking together a negative electrode and a positive electrode via a separator; accommodating the stack in a battery container in a state of, for example, being wound or folded in accordance with a battery shape; injecting an electrolytic solution into the battery container; and sealing the battery container. The shape of the battery may be an appropriate shape, for example, a coin shape, a cylindrical shape, a square shape, or a laminate shape.

The electrolytic solution may be a liquid or a gel, and an electrolytic solution effectively expressing a function as a battery may be selected from known electrolytic solutions to be used for electrical storage devices depending on the kind of the active material. The electrolytic solution may be a solution obtained by dissolving an electrolyte in an appropriate solvent. Examples of such electrolyte and solvent include compounds described in JP 5999399 B2.

The above-mentioned electrical storage device may be applied to, for example, a lithium ion secondary battery, an electric double layer capacitor, and a lithium ion capacitor each of which needs to be discharged at a high current density. Of those, a lithium ion secondary battery is particularly preferred. In the electrical storage device electrode and the electrical storage device according to the above-mentioned embodiments, known members for lithium ion secondary batteries, for electric double layer capacitors, and for lithium ion capacitors may be used as members other than the binder composition for an electrical storage device.

5. Examples

The present invention is specifically described below by way of Examples, but the present invention is by no means limited to these Examples. The terms "part(s)" and "%" in Examples and Comparative Examples are by mass unless otherwise stated.

5.1. Example 1

5.1.1. Preparation and Physical Property Evaluation of Binder Composition for Electrical Storage Device (1) Preparation of Binder Composition for Electrical Storage Device A binder composition for an electrical storage device containing a polymer (A) was obtained by such two-stage polymerization as described below. A reaction vessel was loaded with 200 parts by mass of water, a monomer mixture formed of 15 parts by mass of 1,3-butadiene, 15 parts by mass of styrene, and 2 parts by mass of acrylic acid, 0.1 part by mass of tert-dodecyl mercaptan serving as a chain transfer agent, 0.2 part by mass of a sodium alkyl diphenyl ether disulfonate serving as an emulsifier, and 0.2 part by mass of potassium persulfate serving as a polymerization initiator. Polymerization was performed under stirring at 70° C. for 12 hours, and then it was recognized that the polymerization conversion rate was 90%. Next, the reaction vessel was further loaded with 200 parts by mass of water, 55 parts by mass of styrene, 3 parts by mass of acrylic acid, 5 parts by mass of methyl methacrylate, and 5 parts by mass of acrylonitrile, followed by polymerization at 75° C. for 12 hours, and then it was recognized that the polymerization conversion rate was 98%. Unreacted monomers were removed from the thus obtained dispersion of particles of the polymer (A), and the remainder was concentrated. A 2.5% aqueous sodium hydroxide solution was added, and then water was removed using an evaporator to provide a binder composition for an electrical storage device having a solid content concentration of 40 mass % and a pH of 8.0 and containing the particles of the polymer (A).

(2) Measurement of Number Average Particle Diameter

One droplet of latex obtained by diluting the binder composition for an electrical storage device obtained above to 0.1 wt % was dropped onto a collodion support film with a pipette, and one droplet of a 0.02 wt % osmium tetroxide solution was further dropped onto the collodion support film with a pipette, followed by air drying for 12 hours to prepare a sample. The thus prepared sample was observed using a transmission electron microscope (TEM, manufactured by Hitachi High-Technologies Corporation, model number:

"H-7650") at a magnification of 10K×. Image analysis was performed with the program of HITACHI EMIP, and the number average particle diameter of 50 randomly selected particles of the polymer (A) was calculated. The measurement result is shown in Table 1.

(3) Measurement of pH

The binder composition for an electrical storage device obtained above was measured for its pH at 25° C. using a pH meter (manufactured by Horiba, Ltd.), and as a result, was found to have a pH of 8.0.

(4) Measurement of Electrolytic Solution Swelling Degree

The polymer (A) obtained above was dried in a thermostat at 85° C. for 24 hours to produce a film. 1 g of the film was immersed in 20 mL of a mixed liquid formed of ethylene carbonate (EC), diethyl carbonate (DEC), and ethyl methyl carbonate (EMC) (EC/DEC/EMC=1/1/1 (volume ratio). This mixed liquid is hereinafter referred to as "EC/DEC/EMC".), and the whole was shaken at 70° C. for 24 hours. Then, an insoluble content was separated by filtration through a wire mesh of 300 mesh, and then the EC/DEC/EMC of a soluble content was removed by evaporation. The weight (Y (g)) of the resultant residue was measured. In addition, the EC/DEC/EMC adhering to the surface of the insoluble content (film) separated by the above-mentioned filtration was removed through absorption by paper, and then the weight (Z (g)) of the insoluble content (film) was measured. An electrolytic solution swelling degree was determined by the following equation (2), and as a result, the electrolytic solution swelling degree of the polymer (A) was 160 mass %.

$$\text{Electrolytic solution swelling degree (mass \%)}=(Z/(1-Y))\times100 \qquad (2)$$

(5) Measurement of Dynamic Viscoelasticity

The polymer (A) obtained above was dried at 40° C. for 24 hours to produce a uniform film having a thickness of 1.0±0.3 mm. The film was dried in a vacuum dryer at 160° C. for 30 minutes. The film was taken out of the vacuum dryer and cut into a strip shape measuring 10 mm by 10 mm, and the resultant was used as a sample for measurement. Then, dynamic viscoelasticity was measured using a dynamic viscoelasticity-measuring apparatus (manufactured by Anton Paar, model: "MCR 301") with the measurement sample being fixed with parallel plates (product name: "PP-12") under the measurement conditions of a shear mode, a measurement frequency of from 0.01 Hz to 1 Hz, and a temperature increase speed of 0.1° C./min in the temperature region of from −70° C. to 180° C. As a result, the peak top of tan δ on a low temperature side (tan δ−1) was observed at 10° C., and its value was 0.02. In addition, the peak top of tan δ on a high temperature side (tan δ−2) was observed at 120° C., and its value was 1.0. In Tables 1 to 3 below, the peak top of the tan δ on the low temperature side is represented by "tan δ−1", and the peak top of the tan δ on the high temperature side is represented by "tan δ−2".

(6) Measurement of Martens Hardness

About 1 g of the polymer (A) obtained above was added onto a Si wafer measuring about 1 cm by about 1 cm, and a thin film was produced using spin coating (manufactured by Mikasa Co., Ltd., model: "MS-A-150") and dried on a hot plate. The Martens hardness of the thin film was calculated to be 300 MPa using a picoindenter (manufactured by Helmut Fischer, model: "HM500").

5.1.2. Preparation of Slurry for Electrical Storage Device Electrode (1) Synthesis of Silicon Material (Active Material)

A mixture of pulverized silicon dioxide powder (average particle diameter: 10 μm) and carbon powder (average particle diameter: 35 μm) was subjected to heat treatment in an electric furnace, whose temperature had been adjusted to fall within the range of from 1,100° C. to 1,600° C., under a stream of nitrogen (0.5 NL/min) for 10 hours to provide powder (average particle diameter: 8 lam) of a silicon oxide represented by the compositional formula $SiO_x$ (x=0.5 to 1.1). 300 g of the powder of the silicon oxide was loaded into a batch-type heating furnace, and while a reduced pressure of 100 Pa in terms of absolute pressure was maintained with a vacuum pump, the temperature was increased from room temperature (25° C.) to 1,100° C. at a temperature increase rate of 300° C./h. Then, while the pressure in the heating furnace was maintained at 2,000 Pa and while a methane gas was introduced at a flow rate of 0.5 NL/min, heat treatment (black lead coating treatment) was performed at 1,100° C. for 5 hours. After the completion of the black lead coating treatment, the resultant was cooled to room temperature at a temperature decrease rate of 50° C./h to provide about 330 g of powder of black lead-coated silicon oxide. The black lead-coated silicon oxide was conductive powder (active material) of silicon oxide having its surface covered with black lead, the average particle diameter thereof was 10.5 μm, and the ratio of the black lead coating with respect to 100 mass % of the entirety of the obtained black lead-coated silicon oxide was 2 mass %.

(2) Preparation of Slurry for Electrical Storage Device Electrode

A twin-screw planetary mixer (manufactured by Primix Corporation, product name: "TK HIVIS MIX 2P-03") was charged with 1 part by mass of a thickener (product name: "CMC2200", manufactured by Daicel Corporation) (value in terms of solid content, added as an aqueous solution having a concentration of 2 mass %), 4 parts by mass of the polymer (A) (value in terms of solid content, added as the binder composition for an electrical storage device obtained above), 90.25 parts by mass (value in terms of solid content) of artificial black lead (manufactured by Showa Denko Materials Co., Ltd., product name: "MAG"), which was highly crystalline graphite, serving as a negative electrode active material, 4.75 parts by mass (value in terms of solid content) of the powder of the black lead-coated silicon oxide obtained above, and 1 part by mass of carbon (manufactured by Denka Company Limited, acetylene black) serving as a conductivity-imparting agent, and the contents were stirred at 60 rpm for 1 hour to provide a paste. Water was charged to the resultant paste to adjust its solid content concentration to 48 mass %, and then the contents were stirred and mixed using a defoaming stirrer (manufactured by Thinky Corporation, product name: "Awatori Rentaro") at 200 rpm for 2 minutes, at 1,800 rpm for 5 minutes, and then under a reduced pressure (about $2.5\times10^4$ Pa) at 1,800 rpm for 1.5 minutes to prepare a slurry for an electrical storage device electrode (C/Si=95/5) containing 5 mass % of Si in the negative electrode active material.

In addition, a slurry for an electrical storage device electrode (C/Si=100/0) containing no Si in its negative electrode active material was prepared in the same manner as the slurry for an electrical storage device electrode (C/Si=95/5) except that the use amounts of the artificial black lead and the powder of the black lead-coated silicon oxide were adjusted.

5.1.3. Production and Evaluation of Electrical Storage Device (1) Production of Electrical Storage Device Electrode (Negative Electrode)

The slurry for an electrical storage device electrode (C/Si=95/5 or C/Si=100/0) obtained above was uniformly applied to the surface of a current collector formed of copper foil having a thickness of 20 μm by a doctor blade method so that a film thickness after drying was 80 μm, and the resultant was dried at 60° C. for 10 minutes and then subjected to drying treatment at 120° C. for 10 minutes. After that, press processing was performed with a roll pressing machine so that the active material layer had a density of 1.5 g/cm³. Thus, an electrical storage device electrode (negative electrode) was obtained.

(2) Evaluation of Adhesive Strength of Negative Electrode Coating Layer

In the surface of the electrical storage device electrode obtained above, ten cuts each having a depth extending from the active material layer to the current collector were made with a knife at intervals of 2 mm in each of longitudinal and latitudinal directions, to thereby make cuts in a grid shape. A pressure-sensitive adhesive tape having a width of 18 mm (manufactured by Nichiban Co., Ltd., product name: "Cellotape" (trademark), specified in JIS Z1522) was attached to the cuts and immediately peeled off, and the degree of detachment of the active material was evaluated by visual judgment. Evaluation criteria are as described below. The evaluation result is shown in Table 1.

(Evaluation Criteria)

Score 5: The number of detached pieces of the active material layer is 0.

Score 4: The number of detached pieces of the active material layer is from 1 to 5.

Score 3: The number of detached pieces of the active material layer is from 6 to 20.

Score 2: The number of detached pieces of the active material layer is from 21 to 40.

Score 1: The number of detached pieces of the active material layer is 41 or more.

(3) Production of Counter Electrode (Positive Electrode)

A twin-screw planetary mixer (manufactured by Primix Corporation, product name: "TK HIVIS MIX 2P-03") was charged with 4 parts by mass (value in terms of solid content) of a binder for an electrochemical device electrode (manufactured by Kureha Corporation, product name: "KF Polymer #1120"), 3.0 parts by mass of a conductive aid (manufactured by Denka Company Limited, product name: "DENKA BLACK 50% press product"), 100 parts by mass (value in terms of solid content) of LiCoO2 having an average particle diameter of 5 μm (manufactured by Hayashi Kasei Co., Ltd.) serving as a positive electrode active material, and 36 parts by mass of N-methylpyrrolidone (NMP), and the contents were stirred at 60 rpm for 2 hours. NMP was added to the resultant paste to adjust its solid content concentration to 65 mass %, and then the contents were stirred and mixed using a defoaming stirrer (manufactured by Thinky Corporation, product name: "Awatori Rentaro") at 200 rpm for 2 minutes, at 1,800 rpm for 5 minutes, and then under a reduced pressure (about $2.5\times10^4$ Pa) at 1,800 rpm for 1.5 minutes to prepare a slurry for a positive electrode. The slurry for a positive electrode was uniformly applied to the surface of a current collector formed of aluminum foil by a doctor blade method so that a film thickness after solvent removal was 80 μm, and the solvent was removed by heating at 120° C. for 20 minutes. After that, press processing was performed with a roll pressing machine so that the active material layer had a density of 3.0 g/cm$^3$. Thus, a counter electrode (positive electrode) was obtained.

(4) Assembly of Lithium Ion Battery Cell

In a glove box in which Ar purging had been performed so that the dew point was −80° C. or less, the negative electrode produced above that had been punch-molded to a diameter of 15.95 mm was placed on a bipolar coin cell (manufactured by Hohsen Corp., product name: "HS Flat Cell"). Then, a separator formed of a porous film made of polypropylene that had been punched to a diameter of 24 mm (manufactured by Celgard, LLC, product name: "Celgard #2400") was placed, and further, 500 μL of an electrolytic solution was injected in such a manner as not to let air in. After that, the positive electrode produced above that had been punch-molded to a diameter of 16.16 mm was placed, and the exterior body of the bipolar coin cell was fastened with screws for sealing. Thus, a lithium ion battery cell (electrical storage device) was assembled. The electrolytic solution used in this case is a solution obtained by dissolving LiPF$_6$ at a concentration of 1 mol/L in a solvent containing ethylene carbonate and ethyl methyl carbonate at a mass ratio of 1/1.

(5) Evaluation of Charge-Discharge Cycle Characteristic

For the electrical storage device produced above, in a thermostat controlled to a temperature of 60° C., charge was started at a constant current (1.0 C). At the time point when the voltage reached 4.2 V, the charge was subsequently continued at a constant voltage (4.2 V). The time point when the current value reached 0.01 C was defined as charge completion (cut-off). After that, discharge was started at a constant current (1.0 C). The time point when the voltage reached 3.0 V was defined as discharge completion (cut-off), and a discharge capacity in the 1st cycle was calculated. In this manner, charge and discharge were repeated 100 times. A capacity retention ratio was calculated by the following equation (3) and evaluated by the following criteria. The evaluation result is shown in Table 1.

$$\text{Capacity retention ratio (\%)} = (\text{discharge capacity in 100th cycle}) / (\text{discharge capacity in 1st cycle}) \quad (3)$$

(Evaluation Criteria)

Score 5: The capacity retention ratio is 95% or more.

Score 4: The capacity retention ratio is from 90% or more to less than 95%.

Score 3: The capacity retention ratio is from 85% or more to less than 90%.

Score 2: The capacity retention ratio is from 80% or more to less than 85%.

Score 1: The capacity retention ratio is from 75% or more to less than 80%.

Score 0: The capacity retention ratio is less than 75%.

(6) Evaluation of Resistance at High Temperature

For the electrical storage device produced above, in a thermostat controlled to a temperature of 60° C., charge was started at a constant current (1.0 C). At the time point when the voltage reached 4.2 V, the charge was subsequently continued at a constant voltage (4.2 V). The time point when the current value reached 0.01 C was defined as charge completion (cut-off). After that, discharge was started at a constant current (0.05 C). The time point when the voltage reached 3.0 V was defined as discharge completion (cut-off), and a discharge capacity in the 0th cycle was calculated. Further, charge was started at a constant current (1.0 C). At the time point when the voltage reached 4.2 V, the charge was subsequently continued at a constant voltage (4.2 V).

The time point when the current value reached 0.01 C was defined as charge completion (cut-off). After that, discharge was started at a constant current (1.0 C). The time point when the voltage reached 3.0 V was defined as discharge completion (cut-off), and a discharge capacity in the 1st cycle was calculated. In this manner, charge and discharge were repeated 100 times. After charge and discharge had been repeated 100 times, charge and discharge were performed in the same manner as in the 0th cycle, and a discharge capacity in the 101st cycle was evaluated. A resistance increase rate was calculated by the following equation (4), and evaluated by the following criteria.

$$\text{Resistance increase rate (\%)} = (\text{discharge capacity in 101st cycle-discharge capacity in 100th cycle}) / (\text{discharge capacity in 0th cycle-discharge capacity in 1st cycle}) \times 100 \quad (4)$$

(Evaluation Criteria)

Score 5: The resistance increase rate is from 100% or more to less than 150%.

Score 4: The resistance increase rate is from 150% or more to less than 200%.

Score 3: The resistance increase rate is from 200% or more to less than 250%.

Score 2: The resistance increase rate is from 250% or more to less than 300%.

Score 1: The resistance increase rate is from 300% or more to less than 350%.

Score 0: The resistance increase rate is 350% or more.

In the measurement conditions, "1 C" refers to a current value at which discharge is completed in 1 hour when a cell having a certain electric capacity is subjected to constant-current discharge. For example, "0.1 C" refers to a current value at which discharge is completed in 10 hours, and "10 C" refers to a current value at which discharge is completed in 0.1 hour.

5.2. Examples 2 to 12 and Comparative Examples 1 to 5

Binder compositions for electrical storage devices each having a solid content concentration of 40 mass % and containing polymer particles were respectively obtained in the same manner as in the "5.1.1. Preparation and Physical Property Evaluation of Binder Composition for Electrical Storage Device (1) Preparation of Binder Composition for Electrical Storage Device" section except that the kinds and amounts of the monomers, and the amount of the emulsifier were respectively changed as shown in Tables 1 to 3 below, and their respective physical properties were evaluated. FIG. 1 shows a graph showing a relationship between measurement temperature and tan δ in the dynamic viscoelasticity measurement of the film produced in Example 3.

Further, in the same manner as in Example 1 described above except for using the binder compositions for electrical storage devices prepared above, slurries for electrical storage device electrodes were respectively prepared, and electrical storage device electrodes and electrical storage devices were respectively produced. Evaluations were performed in the same manner as in Example 1 described above.

5.3. Example 13

A slurry for an electrical storage device electrode was prepared in the same manner as in Example 4 except that, in Example 4, the thickener was changed to 0.9 part by mass of a CMC (product name: "CMC2200", manufactured by Daicel Corporation) and 0.1 part by mass of a CNF (product name: "CELISH KY-100G", manufactured by Daicel Corporation, fiber diameter: 0.07 μm). An electrical storage device electrode and an electrical storage device were each produced therefrom. Evaluations were performed in the same manner as in Example 1 described above. The results are shown in Table 4 below.

5.4. Example 14

A slurry for an electrical storage device electrode was prepared in the same manner as in Example 4 except that, in Example 4, the thickener was changed to 0.8 part by mass of a CMC (product name: "CMC2200", manufactured by Daicel Corporation) and 0.2 part by mass of a CNF (product name: "CELISH KY-100G", manufactured by Daicel Corporation, fiber diameter: 0.07 μm). An electrical storage device electrode and an electrical storage device were each produced therefrom. Evaluations were performed in the same manner as in Example 1 described above.

The results are shown in Table 4 below.

5.5. Evaluation Results

Tables 1 to 3 below show the polymer compositions used in Examples 1 to 12 and Comparative Examples 1 to 5, the respective measurement results of physical properties, and the respective evaluation results. Table 4 below shows the polymer component compositions used in Examples 13 and 14 and the respective evaluation results.

TABLE 1

| | | | | Example 1 | Example 2 | Example 3 | Example 4 | Example 5 | Example 6 |
|---|---|---|---|---|---|---|---|---|---|
| First stage polymerization components | (a1) | Conjugated diene compound | BD (part(s) by mass) | 15 | 50 | 24 | 30 | 5 | 18 |
| | (a2) | Unsaturated carboxylic acid | TA (part(s) by mass) | | | | 2 | | |
| | | | AA (part(s) by mass) | 2 | | | | | |
| | | | MAA (part(s) by mass) | | | | 3 | | |
| | (a3) | Aromatic vinyl compound | ST (part(s) by mass) | 15 | | 25 | | 15 | |
| | | | DVB (part(s) by mass) | | | | | | |
| | (a4) | Unsaturated carboxylic acid ester | MMA (part(s) by mass) | | | | 10 | | |
| | | | BA (part(s) by mass) | | | | | | |
| | | | 2EHA (part(s) by mass) | | | | | | |
| | | | CHMA (part(s) by mass) | | | | | | |
| | | | EDMA (part(s) by mass) | | | | | | |
| | | | HEMA (part(s) by mass) | | | | | | |
| | | | HEA (part(s) by mass) | | | | | | |
| | (a5) | α,β-Unsaturated nitrile compound | AN (part(s) by mass) | | 20 | | | | 20 |
| | (a6) | (Meth)acrylamide | AAM (part(s) by mass) | | | | | | 3 |
| | | | MAM (part(s) by mass) | | | | | | |
| | (a7) | Compound having sulfonic acid group | NASS (part(s) by mass) | | | | | | 2 |
| | | Total for first stage | | 32 | 70 | 49 | 45 | 20 | 43 |
| Second stage polymerization components | (a1) | Conjugated diene compound | BD (part(s) by mass) | | 10 | | 15 | 15 | 20 |
| | (a2) | Unsaturated carboxylic acid | TA (part(s) by mass) | | 1 | | 3 | | |
| | | | AA (part(s) by mass) | 3 | | 1 | 2 | | 3 |
| | | | MAA (part(s) by mass) | | 1 | | | 5 | |
| | (a3) | Aromatic vinyl compound | ST (part(s) by mass) | 55 | | 50 | | 50 | |
| | | | DVB (part(s) by mass) | | | | | 2 | |
| | (a4) | Unsaturated carboxylic acid ester | MMA (part(s) by mass) | 5 | 18 | | 25 | | |
| | | | BA (part(s) by mass) | | | | | | |
| | | | 2EHA (part(s) by mass) | | | | | | |
| | | | CHMA (part(s) by mass) | | | | | 5 | |
| | | | EDMA (part(s) by mass) | | | | | 5 | |
| | | | HEMA (part(s) by mass) | | | | | | |
| | | | HEA (part(s) by mass) | | | | | | 2 |
| | (a5) | α,β-Unsaturated nitrile compound | AN (part(s) by mass) | 5 | | | | 5 | 30 |
| | (a6) | (Meth)acrylamide | AAM (part(s) by mass) | | | | | | 2 |
| | | | MAM (part(s) by mass) | | | | | | |
| | (a7) | Compound having sulfonic acid group | NASS (part(s) by mass) | | | | | 3 | |
| | | Total for second stage | | 68 | 30 | 51 | 55 | 80 | 57 |
| Total | (a1) | Conjugated diene compound (part(s) by mass) | | 15 | 60 | 24 | 45 | 20 | 38 |
| | (a2) | Unsaturated carboxylic acid (part(s) by mass) | | 5 | 2 | 1 | 10 | 5 | 3 |
| | (a3) | Aromatic vinyl compound (part(s) by mass) | | 70 | 0 | 75 | 0 | 67 | 0 |
| | (a4) | Unsaturated carboxylic acid ester (part(s) by mass) | | 5 | 18 | 0 | 45 | 0 | 2 |
| | (a5) | α,β-Unsaturated nitrile compound (part(s) by mass) | | 5 | 20 | 0 | 0 | 5 | 50 |
| | (a1) + (a2) + (a3) (part(s) by mass) | | | 90 | 62 | 100 | 55 | 92 | 41 |
| | (a1) + (a2) + (a4) + (a5) (part(s) by mass) | | | 30 | 100 | 25 | 100 | 30 | 93 |
| | Total for first stage + second stage | | | 100 | 100 | 100 | 100 | 100 | 100 |
| Physical properties | Number average particle diameter (nm) | | | 200 | 300 | 100 | 100 | 150 | 200 |
| | pH | | | 8.0 | 7.0 | 9.5 | 4.5 | 7.5 | 10.0 |
| | Electrolytic solution swelling degree (mass %) | | | 160 | 450 | 140 | 350 | 160 | 500 |
| | Dynamic viscoelasticity | tanδ-1 temperature (° C.) | | 10 | −40 | −15 | −20 | 49 | 20 |
| | | tanδ-1 | | 0.02 | 0.50 | 0.05 | 0.25 | 0.01 | 0.10 |

TABLE 1-continued

| | | | Example 1 | Example 2 | Example 3 | Example 4 | Example 5 | Example 6 |
|---|---|---|---|---|---|---|---|---|
| | tanδ-2 temperature (° C.) | | 120 | 60 | 110 | 75 | 90 | 51 |
| | tanδ-2 | | 1.0 | 0.5 | 0.5 | 0.2 | 3.0 | 0.3 |
| | tanδ-2/tanδ-1 | | 50 | 1 | 10 | 0.8 | 300 | 3 |
| | Martens hardness (MPa) | | 300 | 25 | 200 | 20 | 50 | 40 |
| Evaluation results | C/Si = 100/0 | Adhesive strength | 5 | 5 | 5 | 5 | 3 | 4 |
| | | 100 Cy capacity retention ratio | 5 | 4 | 5 | 5 | 4 | 4 |
| | | Resistance increase rate | 5 | 3 | 5 | 4 | 4 | 3 |
| | C/Si = 95/5 | Adhesive strength | 5 | 4 | 4 | 5 | 4 | 3 |
| | | 100 Cy capacity retention ratio | 5 | 4 | 5 | 5 | 4 | 4 |
| | | Resistance increase rate | 5 | 3 | 5 | 4 | 4 | 4 |

TABLE 2

| | | | | Ex 7 | Ex 8 | Ex 9 | Ex 10 | Ex 11 | Ex 12 |
|---|---|---|---|---|---|---|---|---|---|
| First stage polymerization components | (a1) | Conjugated diene compound | BD (part(s) by mass) | 20 | 40 | | 10 | 15 | 40 |
| | (a2) | Unsaturated carboxylic acid | TA (part(s) by mass) | | 1 | | | 2 | 3 |
| | | | AA (part(s) by mass) | 2 | 1 | 8 | 2 | 2 | 3 |
| | | | MAA (part(s) by mass) | | 1 | | | 2 | 3 |
| | (a3) | Aromatic vinyl compound | ST (part(s) by mass) | 20 | 42 | 40 | 10 | | |
| | | | DVB (part(s) by mass) | | | | 5 | | |
| | (a4) | Unsaturated carboxylic acid ester | MMA (part(s) by mass) | | | | | 10 | |
| | | | BA (part(s) by mass) | 5 | | | | | |
| | | | 2EHA (part(s) by mass) | 5 | | | | | |
| | | | CHMA (part(s) by mass) | | | | | | |
| | | | EDMA (part(s) by mass) | | | | | | |
| | | | HEMA (part(s) by mass) | | | | | | |
| | | | HEA (part(s) by mass) | 3 | | | | | |
| | (a5) | α,β-Unsaturated nitrile compound | AN (part(s) by mass) | | | | | 5 | 10 |
| | (a6) | (Meth)acrylamide | AAM (part(s) by mass) | | | 2 | | | |
| | | | MAM (part(s) by mass) | | | | | | |
| | (a7) | Compound having sulfonic acid group | NASS (part(s) by mass) | | | | | | |
| | | Total for first stage | | 55 | 85 | 50 | 27 | 36 | 59 |
| Second stage polymerization components | (a1) | Conjugated diene compound | BD (part(s) by mass) | | | 30 | 10 | 5 | |
| | (a2) | Unsaturated carboxylic acid | TA (part(s) by mass) | | | | 1 | | |
| | | | AA (part(s) by mass) | | | | | | |
| | | | MAA (part(s) by mass) | | 5 | | 2 | | |
| | (a3) | Aromatic vinyl compound | ST (part(s) by mass) | | 10 | 10 | 40 | 27 | 35 |
| | | | DVB (part(s) by mass) | | | | | 3 | |
| | (a4) | Unsaturated carboxylic acid ester | MMA (part(s) by mass) | 38 | | | 5 | 3 | 6 |
| | | | BA (part(s) by mass) | | | 5 | 5 | 2 | |
| | | | 2EHA (part(s) by mass) | | | 5 | | | |
| | | | CHMA (part(s) by mass) | | | | | 2 | |
| | | | EDMA (part(s) by mass) | | | | | | |
| | | | HEMA (part(s) by mass) | 2 | | | | 5 | |
| | | | HEA (part(s) by mass) | | | | | 2 | |
| | (a5) | α,β-Unsaturated nitrile compound | AN (part(s) by mass) | | | | 5 | 10 | |
| | (a6) | (Meth)acrylamide | AAM (part(s) by mass) | | | | 3 | | |
| | | | MAM (part(s) by mass) | 2 | | | | 5 | |
| | (a7) | Compound having sulfonic acid group | NASS (part(s) by mass) | 3 | | | 2 | | |
| | | Total for second stage | | 45 | 15 | 50 | 73 | 64 | 41 |
| Total | (a1) | Conjugated diene compound (part(s) by mass) | | 20 | 40 | 30 | 20 | 20 | 40 |
| | (a2) | Unsaturated carboxylic acid (part(s) by mass) | | 2 | 8 | 8 | 5 | 6 | 9 |
| | (a3) | Aromatic vinyl compound (part(s) by mass) | | 20 | 52 | 50 | 55 | 30 | 35 |
| | (a4) | Unsaturated carboxylic acid ester (part(s) by mass) | | 53 | 0 | 10 | 10 | 24 | 6 |
| | (a5) | α,β-Unsaturated nitrile compound (part(s) by mass) | | 0 | 0 | 0 | 5 | 15 | 10 |
| | (a1) + (a2) + (a3) (part(s) by mass) | | | 42 | 100 | 88 | 80 | 56 | 84 |
| | (a1) + (a2) + (a4) + (a5) (part(s) by mass) | | | 75 | 48 | 48 | 40 | 65 | 65 |
| | | Total for first stage + second stage | | 100 | 100 | 100 | 100 | 100 | 100 |
| Physical properties | Number average particle diameter (nm) | | | 250 | 150 | 150 | 50 | 500 | 400 |
| | pH | | | 10.5 | 6.0 | 5.5 | 8.5 | 9.0 | 5.0 |
| | Electrolytic solution swelling degree (mass %) | | | 300 | 160 | 250 | 200 | 400 | 300 |

TABLE 2-continued

| | | | Example 7 | Example 8 | Example 9 | Example 10 | Example 11 | Example 12 |
|---|---|---|---|---|---|---|---|---|
| | Dynamic | | −10 | 10 | −30 | 30 | 40 | −20 |
| | viscoelasticity | | 0.05 | 0.40 | 0.40 | 0.01 | 0.10 | 0.01 |
| | | | 150 | 130 | 100 | 90 | 100 | 120 |
| | | tanδ-2/tanδ-1 | 1.5 | 0.2 | 0.3 | 1.0 | 2.0 | 0.1 |
| | | | 30 | 0.5 | 0.75 | 100 | 20 | 10 |
| | Martens hardness (MPa) | | 100 | 15 | 30 | 150 | 80 | 250 |
| Evaluation results | C/Si = 100/0 | Adhesive strength | 5 | 5 | 5 | 4 | 3 | 5 |
| | | 100 Cy capacity retention ratio | 5 | 5 | 5 | 4 | 4 | 5 |
| | | Resistance increase rate | 5 | 5 | 5 | 4 | 5 | 5 |
| | C/Si = 95/5 | Adhesive strength | 4 | 5 | 5 | 4 | 4 | 5 |
| | | 100 Cy capacity retention ratio | 5 | 5 | 5 | 4 | 5 | 5 |
| | | Resistance increase rate | 5 | 5 | 5 | 4 | 5 | 5 |

TABLE 3

| | | | | Comparative Example 1 | Comparative Example 2 | Comparative Example 3 | Comparative Example 4 | Comparative Example 5 |
|---|---|---|---|---|---|---|---|---|
| First stage polymerization components | (a1) | Conjugated diene compound | BD (part(s) by mass) | 70 | 5 | 20 | 20 | 40 |
| | (a2) | Unsaturated carboxylic acid | TA (part(s) by mass) | | | | 5 | 1 |
| | | | AA (part(s) by mass) | 1 | | | | 1 |
| | | | MAA (part(s) by mass) | 1 | 2 | | | 1 |
| | (a3) | Aromatic vinyl compound | ST (part(s) by mass) | 10 | | 40 | | 38 |
| | | | DVB (part(s) by mass) | | | | | 2 |
| | (a4) | Unsaturated carboxylic acid ester | MMA (part(s) by mass) | | | 5 | 10 | 5 |
| | | | BA (part(s) by mass) | | 5 | | | |
| | | | 2EHA (part(s) by mass) | | 5 | | | |
| | | | CHMA (part(s) by mass) | | | | | |
| | | | EDMA (part(s) by mass) | | | | | |
| | | | HEMA (part(s) by mass) | | | 5 | | |
| | | | HEA (part(s) by mass) | | | | | |
| | (a5) | α,β-Unsaturated nitrile compound | AN (part(s) by mass) | | 5 | 10 | | 5 |
| | (a6) | (Meth)acrylamide | AAM (part(s) by mass) | | | | | |
| | | | MAM (part(s) by mass) | | | | | 2 |
| | (a7) | Compound having sulfonic acid group | NASS (part(s) by mass) | | | 5 | | |
| | Total for first stage | | | 82 | 22 | 85 | 35 | 95 |
| Second stage polymerization components | (a1) | Conjugated diene compound | BD (part(s) by mass) | | 5 | | | |
| | (a2) | Unsaturated carboxylic acid | TA (part(s) by mass) | | 2 | | | |
| | | | AA (part(s) by mass) | | 2 | | 5 | |
| | | | MAA (part(s) by mass) | | | | 5 | |
| | (a3) | Aromatic vinyl compound | ST (part(s) by mass) | 10 | | 10 | 15 | 5 |
| | | | DVB (part(s) by mass) | | | 1 | | |
| | (a4) | Unsaturated carboxylic acid ester | MMA (part(s) by mass) | | 20 | | 30 | |
| | | | BA (part(s) by mass) | | 20 | | | |
| | | | 2EHA (part(s) by mass) | | 20 | | | |
| | | | CHMA (part(s) by mass) | | | | | |
| | | | EDMA (part(s) by mass) | | | | | |
| | | | HEMA (part(s) by mass) | | | | | |
| | | | HEA (part(s) by mass) | | 5 | | | |
| | (a5) | α,β-Unsaturated nitrile compound | AN (part(s) by mass) | 8 | 4 | | | |
| | (a6) | (Meth)acrylamide | AAM (part(s) by mass) | | | 2 | 5 | |
| | | | MAM (part(s) by mass) | | | 2 | 5 | |
| | (a7) | Compound having sulfonic acid group | NASS (part(s) by mass) | | | | | |
| | Total for second stage | | | 18 | 78 | 15 | 65 | 5 |
| Total | (a1) | Conjugated diene compound (part(s) by mass) | | 70 | 10 | 20 | 20 | 40 |
| | (a2) | Unsaturated carboxylic acid (part(s) by mass) | | 2 | 6 | 0 | 15 | 3 |
| | (a3) | Aromatic vinyl compound (part(s) by mass) | | 20 | 0 | 51 | 15 | 45 |
| | (a4) | Unsaturated carboxylic acid ester (part(s) by mass) | | 0 | 75 | 10 | 40 | 5 |
| | (a5) | α,β-Unsaturated nitrile compound (part(s) by mass) | | 8 | 9 | 10 | 0 | 5 |
| | (a1) + (a2) + (a3) (part(s) by mass) | | | 92 | 16 | 71 | 50 | 88 |
| | (a1) + (a2) + (a4) + (a5) (part(s) by mass) | | | 80 | 100 | 40 | 75 | 53 |
| | Total for first stage + second stage | | | 100 | 100 | 100 | 100 | 100 |

TABLE 3-continued

| | | | Comparative Example 1 | Comparative Example 2 | Comparative Example 3 | Comparative Example 4 | Comparative Example 5 |
|---|---|---|---|---|---|---|---|
| Physical properties | Number average particle diameter (nm) | | 100 | 150 | 200 | 150 | 100 |
| | pH | | 8.0 | 6.0 | 10.0 | 5.0 | 7.5 |
| | Electrolytic solution swelling degree (mass %) | | 200 | 450 | 300 | 250 | 180 |
| | Dynamic viscoelasticity | tanδ-1 temperature (° C.) | −60 | −10 | 60 | 0 | 20 |
| | | tanδ-1 | 0.01 | 0.10 | 0.20 | 0.05 | 0.50 |
| | | tanδ-2 temperature (° C.) | 120 | 30 | 130 | 160 | 110 |
| | | tanδ-2 | 0.5 | 0.1 | 1.0 | 1.0 | 0.2 |
| | | tanδ-2/tanδ-1 | 50 | 1 | 5 | 20 | 0.4 |
| | Martens hardness (MPa) | | 5 | 50 | 400 | 100 | 30 |
| Evaluation results | C/Si = 100/0 | Adhesive strength | 3 | 3 | 1 | 2 | 2 |
| | | 100 Cy capacity retention ratio | 2 | 2 | 2 | 2 | 2 |
| | | Resistance increase rate | 2 | 1 | 3 | 3 | 2 |
| | C/Si = 95/5 | Adhesive strength | 2 | 3 | 1 | 2 | 1 |
| | | 100 Cy capacity retention ratio | 2 | 2 | 2 | 2 | 2 |
| | | Resistance increase rate | 2 | 1 | 3 | 3 | 2 |

TABLE 4

| Composition of slurry for electrical storage device electrode | | Example 13 | Example 14 |
|---|---|---|---|
| Binder composition for electrical storage device | Example 4 (part(s) by mass) | 2 | 2 |
| Thickener | CMC (part(s) by mass) | 0.9 | 0.8 |
| | CNF (part(s) by mass) | 0.1 | 0.2 |
| Evaluation results (C/Si = 100/0) | Adhesive strength | 4 | 5 |
| | 100 Cy capacity retention ratio | 4 | 5 |
| | Resistance increase rate | 5 | 5 |

The abbreviations of the monomers and the thickeners shown in Tables 1 to 4 above represent the following compounds, respectively.

<Conjugated Diene Compound>
    BD: 1,3-butadiene
<Unsaturated Carboxylic Acid>
    TA: itaconic acid
    AA: acrylic acid
    MAA: methacrylic acid
<Aromatic Vinyl Compound>
    ST: styrene
    DVB: divinylbenzene
<Unsaturated Carboxylic Acid Ester>
    MMA: methyl methacrylate
    BA: butyl acrylate
    2EHA: 2-ethylhexyl acrylate
    CHMA: cyclohexyl methacrylate
    EDMA: ethylene glycol dimethacrylate
    HEMA: 2-hydroxyethyl methacrylate
    HEA: 2-hydroxyethyl acrylate
<α,β-Unsaturated Nitrile Compound>
    AN: acrylonitrile
<(Meth)acrylamide>
    AAM: acrylamide
    MAM: methacrylamide
<Compound Having Sulfonic Acid Group>
    NASS: sodium styrenesulfonate
<Thickener>
    CMC: product name: "CMC2200", manufactured by Daicel Corporation, sodium carboxymethyl cellulose CNF: product name: "CELISH KY-100G", manufactured by Daicel Corporation, microfibrous cellulose, fiber diameter: 0.07 μm As apparent from Tables 1 and 2 above, as compared to the cases of Comparative Examples 1 to 5, the slurries for electrical storage device electrodes prepared using the binder compositions for electrical storage devices according to the present invention shown in Examples 1 to 12 were each able to suitably bind active materials to each other to reduce fusion between particles in the electrode, thus being able to reduce internal resistance, and moreover, each provided an electrical storage device electrode having a satisfactory charge-discharge durability characteristic under high temperature. The reason for this is as described below. As compared to the cases of Comparative Examples 1 to 5 shown in Table 3 above, the polymer (A) contained in the binder composition of each of Examples 1 to 12 shown in Tables 1 and 2 above has one temperature Tp (° C.) of the peak top of the tan δ-1 in the range of from −40° C. or more to less than 50° C., which suggests a high viscosity. Presumably because of this, a high binding force can be maintained. Further, the polymer (A) has one temperature Tp (° C.) of the peak top of the tan δ-2 in the range of from 50° C. or more to 150° C. or less, which suggests that the crosslinking degree of the polymer on the high temperature side is increased. As a result, the particle shape of the binder can be maintained at the time of the production of an electrode. Thus, the permeability of the electrolytic solution between active materials is not inhibited, and hence low resistance can be achieved. Presumably as a result of the foregoing, a satisfactory repeated charge-discharge characteristic and a satisfactory charge-discharge durability characteristic under high temperature were shown.

In addition, as apparent from the results of Table 4 above, it was found that the slurries for electrical storage device electrodes prepared using the binder compositions for electrical storage devices according to the present invention shown in Examples 13 and 14 were each able to suitably bind active materials to each other, and besides, were each able to satisfactorily maintain the adhesiveness between the active material layer and the current collector, despite the combined use of the CNF as the thickener.

The present invention is not limited to the embodiments described above, and various modifications may be made thereto. The present invention encompasses substantially the same configurations as the configurations described in the embodiments (e.g., configurations having the same functions, methods, and results, or configurations having the same objects and effects). The present invention also encompasses configurations obtained by replacing non-essential parts of the configurations described in the embodiments with other configurations. The present invention also encompasses configurations exhibiting the same actions and effects or configurations capable of achieving the same objects as those of the configurations described in the embodiments. The present invention also encompasses configurations obtained by adding known technologies to the configurations described in the embodiments.

The invention claimed is:

1. A binder composition for an electrical storage device, comprising:

a polymer (A); and a liquid medium (B), wherein, with respect to 100 mass % in total of repeating units contained in the polymer (A), the polymer (A) contains:

15 mass % to 60 mass % of a repeating unit (a1) derived from a conjugated diene compound; and 1 mass % to 10 mass % of a repeating unit (a2) derived from an unsaturated carboxylic acid, wherein tan δ (loss elastic modulus/storage elastic modulus) in dynamic viscoelasticity of the polymer (A) has one peak top in a range of from −40° C. or more to less than 50° C., and has one peak top in a range of from 50° C. or more to 150° C. or less, and wherein, when the tan δ at the peak top in the range of from −40° C. or more to less than 50° C. is represented by tan δ(Tp1), and the tan δ at the peak top in the range of from 50° C. or more to 150° C. or less is represented by tan δ(Tp2), a relationship of the following expression (1) is satisfied, $$\tan \delta(Tp2)/\tan \delta(Tp1) \geq 0.5 \quad (1).$$

2. The binder composition for an electrical storage device according to claim 1, wherein the polymer (A) further contains 35 mass % to 75 mass % of a repeating unit (a3) derived from an aromatic vinyl compound, and wherein a total amount of the repeating unit (a1), the repeating unit (a2), and the repeating unit (a3) is 80 mass % or more.

3. The binder composition for an electrical storage device according to claim 1, wherein the polymer (A) contains at least one of a repeating unit (a4) derived from an unsaturated carboxylic acid ester or a repeating unit (a5) derived from an α,β-unsaturated nitrile compound, and wherein a total amount of the repeating unit (a1), the repeating unit (a2), the repeating unit (a4), and the repeating unit (a5) is 65 mass % or more.

4. The binder composition for an electrical storage device according to claim 1, wherein the polymer (A) has a Martens hardness of 15 MPa or more, which is calculated using a picoindenter.

5. The binder composition for an electrical storage device according to claim 1, wherein the polymer (A) is polymer particles, and wherein the polymer particles have a number average particle diameter of 50 nm or more and 500 nm or less.

6. The binder composition for an electrical storage device according to claim 1, wherein the liquid medium (B) is water.

7. A slurry for an electrical storage device electrode, comprising:

the binder composition for an electrical storage device of claim 1; and an active material.

8. The slurry for an electrical storage device electrode according to claim 7, wherein the active material is a silicon material.

9. An electrical storage device electrode, comprising:

a current collector; and an active material layer formed on a surface of the current collector by applying and drying the slurry for an electrical storage device electrode of claim 7.

10. An electrical storage device, comprising the electrical storage device electrode of claim 9.

* * * * *